(12) United States Patent
Isono et al.

(10) Patent No.: US 6,805,415 B2
(45) Date of Patent: Oct. 19, 2004

(54) BRAKE DEVICE

(75) Inventors: Hiroshi Isono, Toyota (JP); Yasuji Mizutani, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/778,794

(22) Filed: Feb. 8, 2001

(65) Prior Publication Data

US 2001/0028194 A1 Oct. 11, 2001

(30) Foreign Application Priority Data

Feb. 14, 2000 (JP) ........................................ 2000-035215

(51) Int. Cl.$^7$ ................................................. B60T 8/88
(52) U.S. Cl. .............................. 303/122.11; 303/122.13; 303/122.03
(58) Field of Search ........................ 303/122.03, 122.04, 303/122.09, 122.1, 122.11, 122.13, 122.14, 114.1, 113.3, 113.4, DIG. 1, DIG. 2; 701/33, 31

(56) References Cited

U.S. PATENT DOCUMENTS

| | | | | |
|---|---|---|---|---|
| 3,936,095 A | * | 2/1976 | Every ........................... | 303/10 |
| 4,212,498 A | * | 7/1980 | Kawaguchi ................. | 303/9.71 |
| 4,708,404 A | * | 11/1987 | Seibert et al. ............. | 303/114.1 |
| 4,867,509 A | * | 9/1989 | Maehara et al. ........... | 303/113.3 |
| 5,934,880 A | * | 8/1999 | Yamada et al. ............... | 303/10 |
| 5,951,116 A | * | 9/1999 | Nagasaka et al. .............. | 303/14 |
| 6,007,163 A | * | 12/1999 | Sawada ..................... | 303/116.2 |
| 6,109,879 A | * | 8/2000 | Yamada et al. ............... | 303/10 |
| 6,276,761 B1 | * | 8/2001 | Beck .......................... | 303/9.61 |
| 6,276,763 B1 | * | 8/2001 | Isono et al. .............. | 303/114.1 |
| 6,289,271 B1 | * | 9/2001 | Isono et al. ................... | 701/31 |

FOREIGN PATENT DOCUMENTS

| | | | |
|---|---|---|---|
| JP | 10147236 A | * | 6/1998 |
| JP | 11227601 A | * | 8/1999 |
| JP | A 11-278238 | | 10/1999 |

OTHER PUBLICATIONS

U.S. patent application Publication 2002/0030402 to Harada et al.*

* cited by examiner

Primary Examiner—Douglas C. Butler
Assistant Examiner—Bradley King
(74) Attorney, Agent, or Firm—Oliff & Berridge, PLC

(57) ABSTRACT

When the increasing gradient of the operating power is larger than a predetermined gradient, if a master pressure PM2 corresponding to a second predetermined operating power F2 is larger than a second predetermined fluid pressure Pth2, a servo function failure in the brake operation is determined; if it is smaller than the second predetermined fluid pressure Pth2, fluid leakage failure (S23, S26, S27) is determined. Furthermore, if the master pressure PM0 corresponding to the first predetermined operating power F0 is larger than a first predetermined fluid pressure Pth1, small amount fluid leakage failure is determined; if it is smaller than the first predetermined fluid pressure Pth1, large amount fluid leakage failure (S28, S29, S30) is determined. On the other hand, when the increasing gradient of the operating power is smaller than a predetermined gradient, if the master pressure PM0 is smaller than the first predetermined fluid pressure Pth1, servo function failure is determined; if it is larger than the first predetermined fluid pressure Pth1, the normal condition (S32, S33) is determined. Therefore, the type of the failure can be detected based on both the operating power and the master pressure.

26 Claims, 13 Drawing Sheets

FIG. 6

| | FLUID LEAK | | BOOSTER FAILURE | NORMAL |
|---|---|---|---|---|
| | SMALL | LARGE | | |
| $F \fallingdotseq F0$ ($F0' \leq F < F1$)<br>$PM0 \geq P_{th1}$ | ○ | × | × | ○ |
| $F \fallingdotseq F2$ ($F2' < F$)<br>$PM2 \geq P_{th2}$ | × | × | ○ | ○ |
| BOTTOMING CONDITION DETECTED | ○ | ○ | × | × |
| BOTTOMING CONDITION $\frac{dPM}{dt} < \beta$ ($\beta < 0$) | ○ | × | × | × |

○ : SATISFIED WITH THE LEFT CONDITION
× : NOT SATISFIED WITH THE LEFT CONDITION

FIG. 12
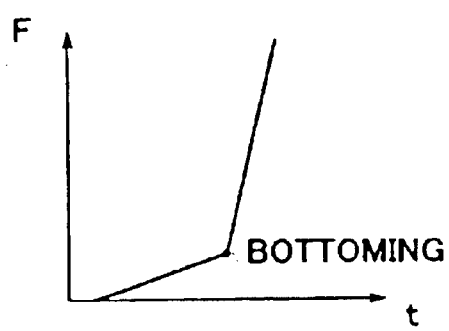
(a) OPERATING POWER
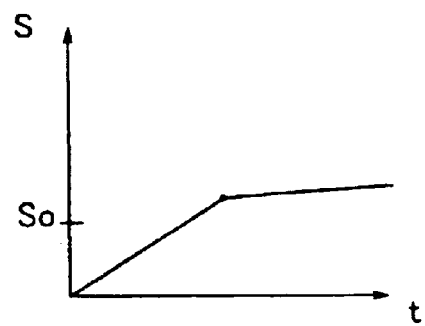
(b) STROKE
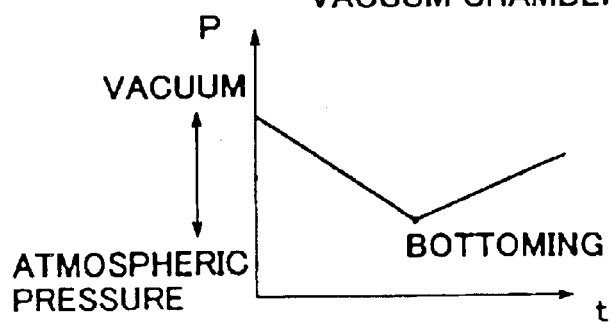
(c) PRESSURE OF VACUUM CHAMBER
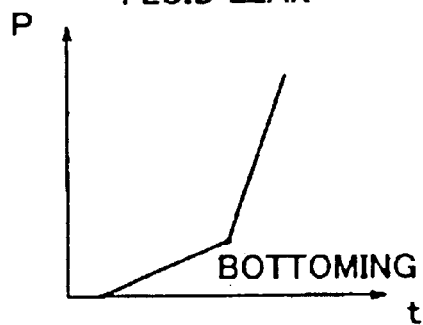
(d) SYSTEM WITHOUT FLUID LEAK
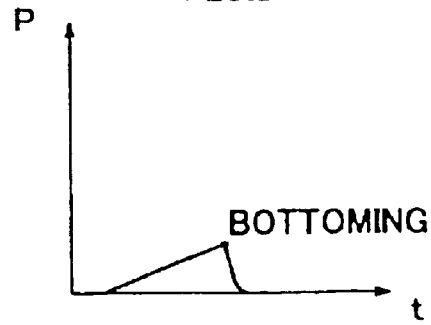
(e) SYSTEM WITH FLUID LEAK

FIG. 13
SERVO FUNCTION FAILURE IN THE BRAKE OPERATION
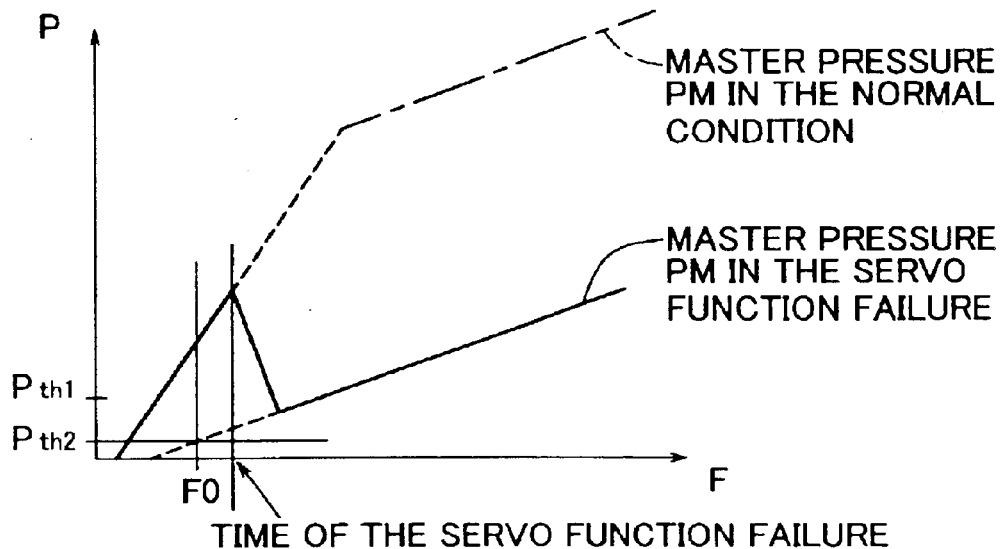
(a) CHANGE OF THE MASTER PRESSURE
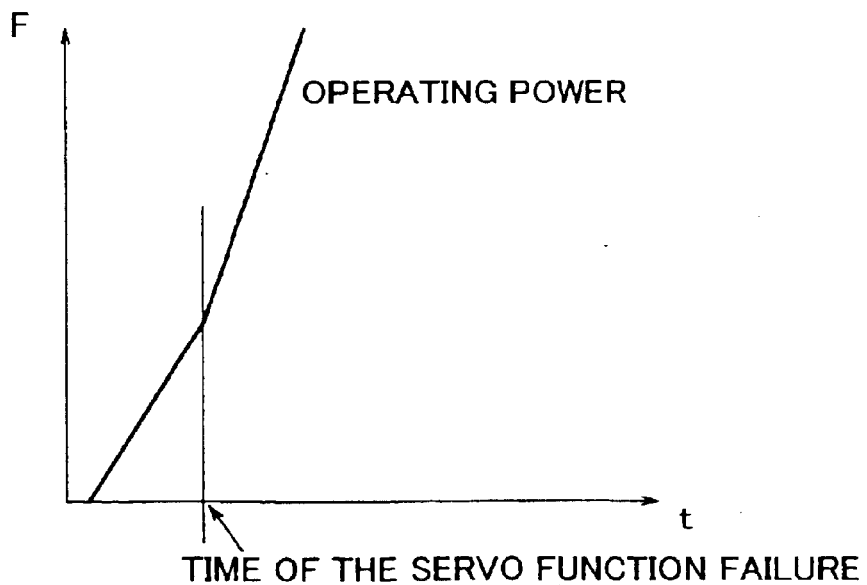
(b) CHANGE OF THE OPERATING POWER

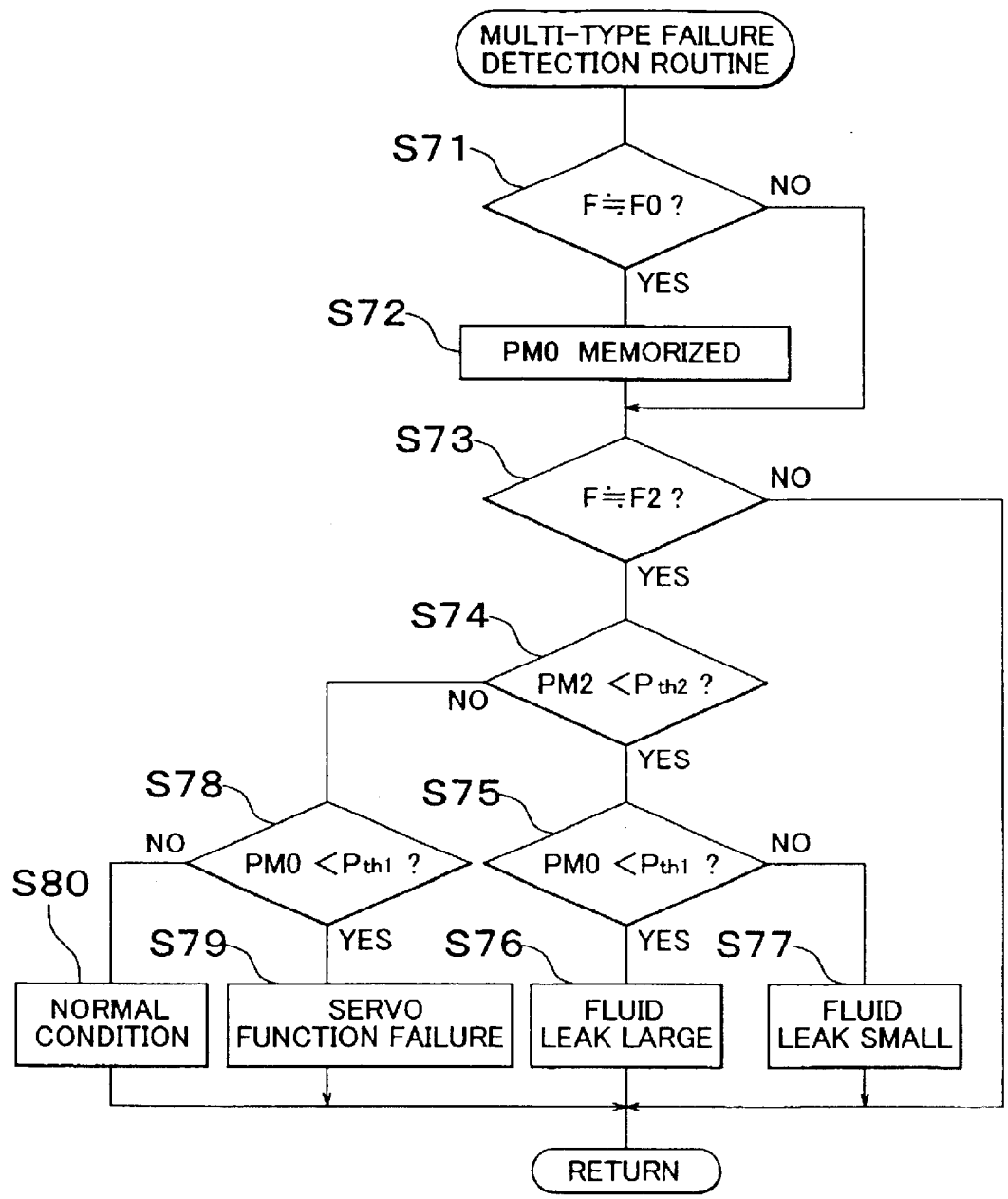

BRAKE DEVICE

BACKGROUND OF THE INVENTION

1. Field of Invention

This invention is related to a brake device which contains a failure detection device.

2. Description of Related Art

An example of a brake device which contains a failure detection device is mentioned in Japanese Laid-Open Patent Application No. 11-278238. In this Japanese Application, a brake device comprises ① a brake operation position detection device which detects the position of a brake pedal, ② a brake fluid pressure detection device which detects the pressure of the brake fluid, ③ failure detection device which detects fluid leakage based on the relations between the detected brake fluid pressure by the brake fluid pressure detection device and the detected brake operation position by the brake operation position detection device, and ④ a brake fluid pressure control device which controls the brake fluid pressure in different patterns based on whether fluid leakage is detected or not by the failure detection device.

The brake fluid pressure control device comprises an electromagnetic fluid pressure control valve which can control the brake fluid pressure, and the supply of electric current to the electromagnetic fluid control valve is controlled so that the brake pressure depends on the amount of brake operation. The output gain to decide this amount of supply electric current is enlarged more compared to the case where the fluid leakage is not detected. Therefore, the decline of a brake fluid pressure caused by the fluid leakage can be controlled.

However, in the above mentioned brake device, only fluid leakage failure was detected, and the several types of failures are not detected distinctively. Therefore, for example, the type of failure might not be distinguished, and the control of the brake pressure might not be done appropriately at the time of the failure.

The subject of this invention is that the types of the failures can be detected and distinguished, and the brake fluid pressure can therefore be controlled appropriately at the time when the failure is detected.

SUMMARY OF THE INVENTION

A brake device having a fluid pressure source device which generates the fluid pressure based on the operation of a brake operating member, and that is actuated by the fluid pressure generated by the fluid pressure source, comprises: a brake operating amount detector which detects the operating amount of the brake operating member, a fluid source pressure detector which detects the pressure generated in the fluid pressure source device, and a failure detector which detects the types of the failures distinctively of the brake device based on the pressure detected by the fluid source pressure detector and the amount of the brake operation detected by the brake operating amount detector.

In this brake device, the types of the failures in the brake device are detected distinctively based on the amount of brake operation and the pressure of the fluid pressure source device. For example, since the conditions of the fluid pressure source device are different based on the types of the failures, the types of the failures are detected distinctively based on the pressure of the fluid pressure source device corresponding to the amount of the brake operation.

BRIEF DESCRIPTION OF THE DRAWINGS

FIG. 6 is a figure which shows the relations between the brake operating power and the master pressure in the above brake device.

FIG. 12 shows the operation power and the stroke, the booster pressure and the condition of the change in each fluid pressure of two pressure chambers of the master cylinder when the bottoming condition occurred in the above brake device, respectively.

FIG. 13 shows the master pressure and the changing condition of the operation power in the above brake device when the servo function failure occurred during the brake operation.

FIG. 14 is a flow chart which shows the multi-mode failure detection routine that is stored in the ROM of the fluid pressure control device contained in the brake device in another embodiment of this invention.

DETAILED DESCRIPTION OF PREFERRED EMBODIMENTS

A brake device which is one embodiment of this invention is explained in detail based on the drawings.

Figure 1:
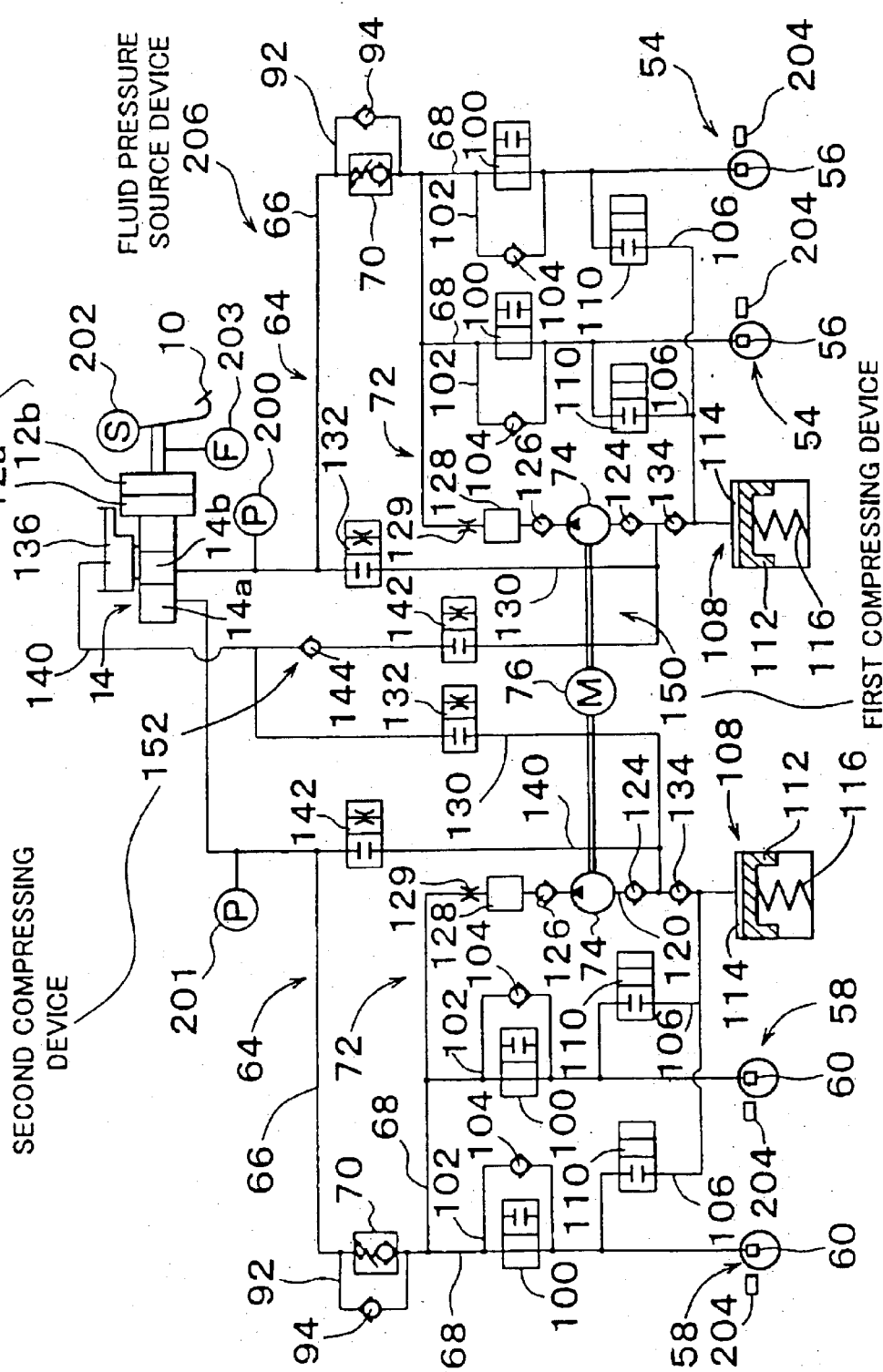
FIG. 1 is a figure of a brake system which shows the brake device according to one embodiment of this invention.

A brake pedal 10, which functions as a brake operating member, is connected to a master cylinder 14 through a vacuum booster (hereafter abbreviated to "booster") 12 in FIG. 1. The master cylinder 14 is of the tandem type, in which two pressure pistons engaged with each other in series can slide, and two pressure chambers 14a and 14b are formed by each other independently in the housing in the front of each pressure piston. The master cylinder 14 generates an equal fluid pressure in each of the pressure chambers mechanically, corresponding to the brake operating power which is the pedal power of the brake pedal 10. The brake device in this embodiment is a two system-type brake.

The detailed explanation of the booster 12 is omitted because it is a common device, which comprises a vacuum chamber 12a connected to a surge tank (the air intake side of the combustion chamber of the engine) and a pressure chamber 12b connected to the vacuum chamber 12a or to the atmosphere depending on the brake pedal 10 operation. This pressure difference does not increase anymore after the pressure of the pressure chamber 12b increases to the atmospheric pressure even if the brake pedal 10 is operated further. The condition when the pressure of the pressure chamber 12b reaches the atmosphere, is the limitation point of the brake power assistance, and the fluid pressure of the master cylinder 14 when the booster 12 reaches the limitation point of the brake power assistance is the limitation pressure of the brake power assistance.

In this embodiment, the brake power characteristic control which assists the brake power is done the moment after the booster 12 reaches the limitation point of brake power assistance.

The brake cylinders 56 which operate each brake 54 of the left and the right front wheel are connected to one pressure chamber of the master cylinder 14. In addition, the brake cylinders 60 which operate each brake 58 of the left and the right rear wheel are connected to the other pressure chamber.

The master cylinder 14 is connected to the brake cylinders 56 of the left and the right front wheel FL, FR by the main fluid path 64 in the fluid pressure brake system on the front wheel side. The main fluid path 64 is extend from the master cylinder 14 and diverged to two fluid paths, and it is constructed by connecting one core fluid path 66 and two divergence fluid paths 68. A pressure control valve 70 is disposed in the middle of the core fluid path 66, and the above-mentioned brake cylinder 56 is connected at each of the ends of each divergence fluid path 68. A pump fluid path 72 is connected to the part between the pressure control valve 70 and the brake cylinders 56 in the main fluid path 64, and a pump 74 is disposed in the middle of that. The pump 74 is driven by a pump motor 76.

Figure 2:
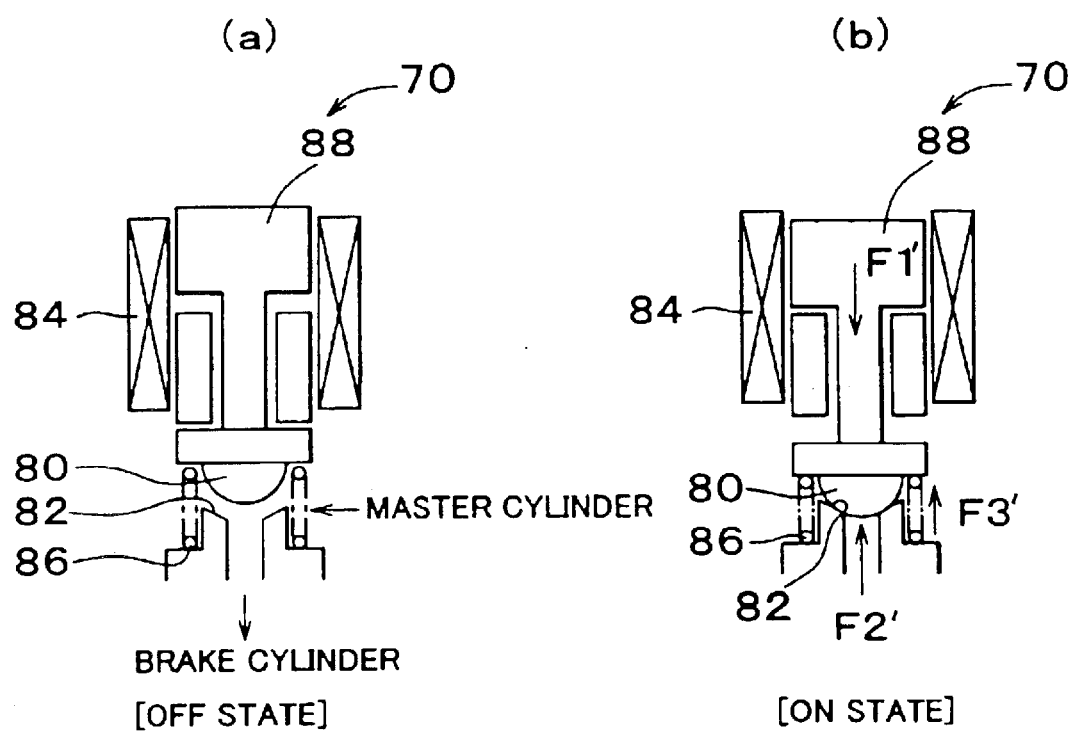
FIG. 2 is an explanatory figure which shows the pressure control valve contained in the above brake device.

In FIG. 2, the pressure control valve 70 controls the connecting condition between the master cylinder 14 and the brake cylinders 56, and it controls the pressure difference between them by a magnetic mechanism. The pressure control valve 70 comprises a housing, which is not illustrated, a valve member 80, which controls the circulation condition of the operated fluid between the master cylinder side and the brake cylinder side in the main fluid path 64, and a valve seat 82, which can be contacted by the valve member 80, and a coil 84, which controls the relative movement of the valve member 80 against the valve seat 82.

In this pressure control valve 70, due to the force of spring 86, the valve member 80 is spaced from the valve seat 82 under the non-activated condition (off condition), when the coil 84 is not excited. Therefore, the flow of the operating fluid of both directions between the master cylinder side and the brake cylinder side are permitted in the main fluid path 64. If the brake operation is done, the fluid pressure of the brake cylinders 56 is changed because of the increasing of the fluid pressure in the master cylinder 14, and these fluid pressures become the same pressure. During this brake operation, if the fluid pressure of the master cylinder (the pressure of the brake cylinder) becomes high, the valve member 80 is never contacted to the valve seat 82 as long as the coil 84 is not excited, because the valve member 80 is pushed away from the valve seat 82. In other words, the pressure control valve 70 is a normally open valve.

On the contrary, during the operated condition of the coil 84 (on condition), an armature 88 is moved by the magnetic power of the coil 84, and the valve member 80 which moves with the armature 88 is contacted to the valve seat 82. At that time, the valve member 80 is pushed by the attraction force F' based on the magnetic power of the coil 84, the sum of the power, which is the pressure difference operating force F2' based on the difference between the fluid pressure of the brake cylinder and the master cylinder and the bias force F3' of the spring 86.

When the attraction force F1' is larger than the sum of the pressure difference operating force F2' based on the difference between the fluid pressure of the brake cylinder and the master cylinder, if the formula FT"≦F1'–F3' is satisfied, the valve member 80 is contacted to the valve seat 82, and the drain of the operating fluid from the brake cylinder is interrupted. The fluid pressure of the brake cylinders 56 is increased, because the operating fluid of high pressure being supplied by the pump 74, and it can be raised more than the fluid pressure of the master cylinder 14.

The pressure difference operating force F2' becomes higher with an increase of the fluid pressure of the brake cylinder, and if the formula F2'>F1'–F3' is satisfied, the valve member 80 is unseated from the valve seat 82. The operating fluid of the brake cylinders 56 is returned to the master cylinder 14, and it is decreased. In this formula, if the bias force F3' is ignored, the fluid pressure of the brake cylinder is controlled to the pressure based on the pressure difference of the attraction force F1', it is higher than the fluid pressure of the brake. In addition, the relative position of the valve member 80 against the valve seat 82 may be decided by the pressure difference operating power, the attraction force and the bias force, therefore, the distance between these elements, i.e., the opening degree, can be controlled by the control of the attraction force. The amount of the attraction force F', which is the magnetic power of the coil 84, is designed to change linearly corresponding to the amount of the exciting current I of the coil 84.

A bypass path 92 is provided in the pressure control valve 70 as shown in FIG. 1, and a bypass valve 94 is set up as a check valve in the middle of that bypass path 92. Even if, when the brake pedal 10 is depressed, the pressure control valve 70 is closed by the fluid power to the movable member in the pressure control valve 70, or the pressure control valve 70 is locked closed mechanically, the flow of the operating fluid which flows to the brake cylinders 56 from the master cylinder 14 is retained.

A pressure holding valve 100, which is a normally open electromagnetic valve, is disposed in the part at the side of the brake cylinders 56 from the connecting point with the pump fluid path 72 of each divergence fluid path 68. When the pressure holding valve is excited, it becomes closed, and the brake cylinder 56 and the master cylinder 14 and the pump 74 are interrupted under that condition, and the fluid pressure of the brake cylinder is held constant. The bypass path 102 is connected to each pressure holding valve 100, and the bypass valve 104 for returning the operating fluid is disposed in each bypass path 102 as a check valve.

A reservoir path 106 extends to a reservoir 108 from the part between the pressure holding valve 100 and the brake cylinder 56 in each divergence fluid path 68. A decompression valve 110, which is a normally closed electromagnetic valve, is disposed in the middle of the reservoir path 106. When the decompression valve 110 is excited, it becomes open, and the flow of operating fluid from the brake cylinder 56 to the reservoir 108 is permitted; therefore, the fluid pressure of the brake cylinder is deceased under that condition.

The reservoir 108 is constructed such that a reservoir piston 112 is disposed in a housing in a substantially air tight condition and is slidable therein. The operating fluid is disposed in a reservoir chamber 114 under the pressure by a spring 116, which functions as an assist means. A reservoir chamber 114 is connected to the main fluid path 64 by the pump fluid path 72. The pulsation of the pump 74 is reduced by a damper room 128 and an orifice 129. The reservoir chamber 114 is larger than the pressure chambers 14a, 14b of the master cylinder 14.

The part between a suction valve 124 and the reservoir 108 of the pump fluid path 72 is connected to the part between the master cylinder 14 and the pressure control valve 70 in the main fluid path 64 by a fluid supply path 130. A flow control valve 132 is disposed in the middle of the fluid supply path 130. The flow control valve 132 is a normally closed electromagnetic valve, and its condition is changed from the closed condition (Off: supply obstruction condition) to the open condition (On: supply condition) when its coil is excited.

A check valve 134 is disposed in the part between the connecting point of the fluid supply path 130 in the pump fluid path 72 and the reservoir 108. This check valve 134 is set up to prevent the flow of operating fluid from the master cylinder 14 to the reservoir 108; therefore, the operating fluid of the master cylinder 14 is flowed to the pump 74 in the high pressure. In addition, the reservoir path 106 is connected between the check valve 134 and the reservoir 108 of the pump fluid path 72. A sub fluid supply path 140 which extends from the master reservoir 136 is connected between the two check valves 124,134 of the pump fluid path 72. In the middle of the sub fluid supply path 140, a sub flow control valve 142 and a check valve 144 are disposed in series.

In this manner, in this embodiment, both the master cylinder 14 and the master reservoir 136 are connected to each of the suction sides of the pump 74 through the fluid supply path 130 and the sub fluid supply path 140. The operating fluid is supplied by the master reservoir 136 through the sub fluid supply path 140 at the time of traction control and vehicle stability control, and the operating fluid is supplied by the fluid supply path 130 at the time of the brake power characteristic control. When the fluid pressure of the brake cylinder 56 is controlled to the higher pressure than the fluid pressure of the master cylinder 14, if the operating fluid of the master cylinder 14 is supplied to the pump 74, the consumption energy of the pump 74 can be reduced when the fluid pressure of the brake cylinder 56 is controlled to have the same pressure. When the operating fluid is supplied by the master cylinder 14 through the fluid supply path 130, the flow control valve 132 is placed in the open condition, and the sub flow control valve 142 is placed in the closed condition. In addition, when the operating fluid is supplied by the master reservoir 136 through the sub fluid supply path 140, the flow control valve 132 is placed in the closed condition, and the flow control valve 142 is placed in the open condition.

There is an advantage to supplying the large amount of operating fluid to the pump 74 (brake cylinder) by the sub fluid supply path 140. The fluid supply path 130 must be a strong and comparatively thin pipe, because the fluid pressure of the master cylinder is high, and it is difficult to supply a large amount of operating fluid of the master cylinder 14 to the pump 74 because there is an orifice between the master reservoir 136 and the master cylinder. On the other hand, since the fluid pressure of the master reservoir 136 is close to atmospheric pressure, the sub fluid supply path 140 can be made from a thick rubber pipe, etc., for example, and a large amount of operated fluid can be supplied.

The check valve 144 is provided to prevent the drainage of the operating fluid from the master cylinder 14 to the master reservoir 136 when both of the flow control valves 142,132 are placed in the open condition. Though normally both of the two flow control valves 132,142 are not placed in the open condition, for example, the master cylinder 14 can be connected with the master reservoir 136 in the condition that one of the valves is kept in the open condition and the other valve is controlled to be in the open condition by the electrical control.

In this embodiment, the first compressing device 150 is constructed by the fluid supply path 130, the flow control valve 132 and the pump 74, and the second compressing device 152 is constructed by the sub fluid supply path 140, the sub flow control valve 142 and the pump 74. The first compressing device 150 and the second compressing device 152 are not limited to the above-mentioned traction control and brake power characteristic control, and can be applied at the failure time of the brake device, too. The reason why the check valve 144 is provided in the fluid supply path 140 of the front wheel side is that it is more important to retain the brake power of the front wheel side than the rear wheel side. The check valve 144 also may be provided in the fluid supply path on the rear wheel side. With regard to the fluid pressure brake system on the rear wheel side, the explanation is omitted because it is the same as the fluid pressure brake system on the front wheel side, and therefore the same numbers are used.

Figure 3:
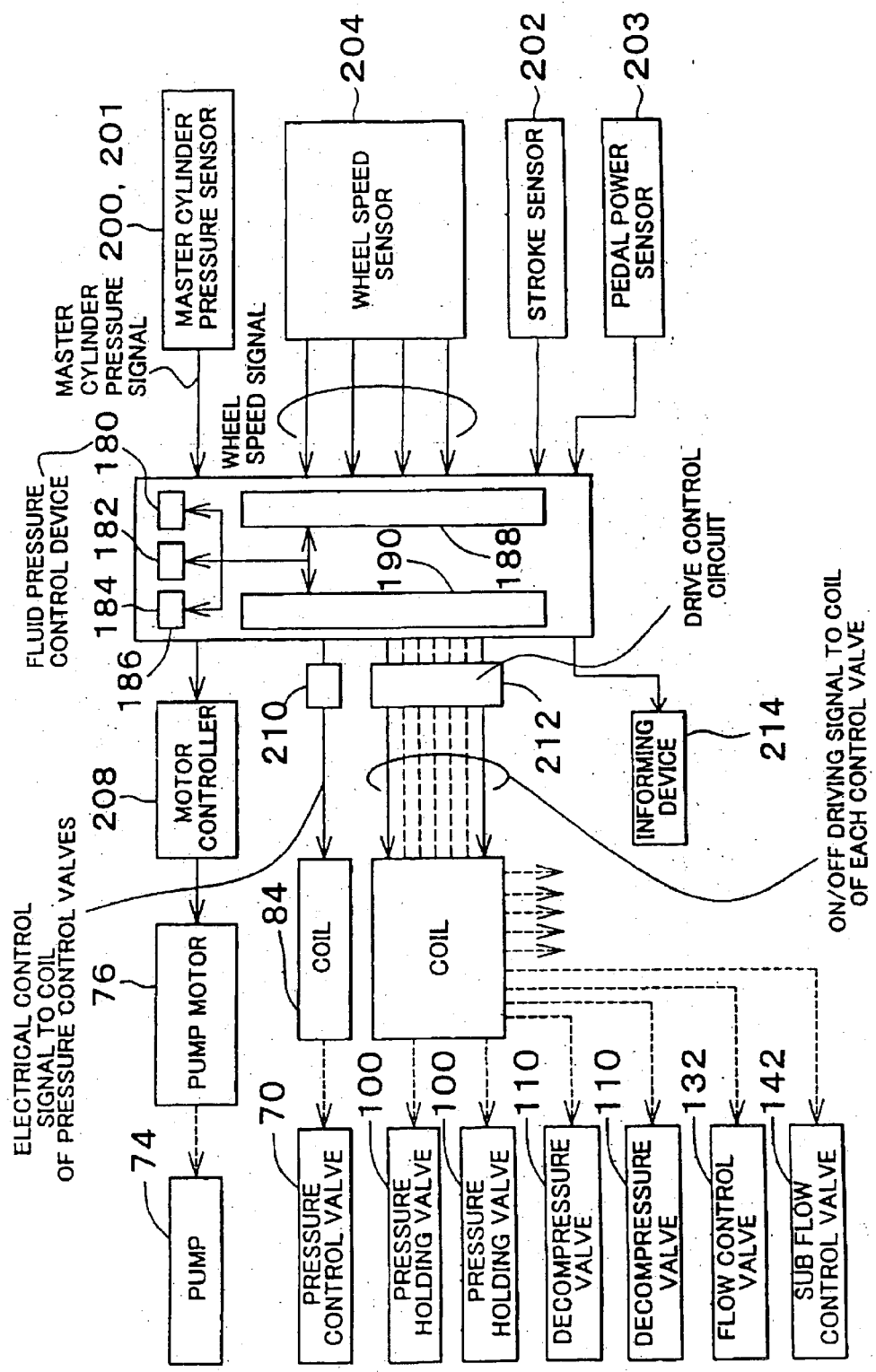
FIG. 3 is a block diagram of the fluid pressure control device of the above brake device.

The hardware structure of this brake device has been explained; next, the software structure is explained based on FIG. 3. This brake device comprises a fluid pressure control device 180 which has a computer. The fluid pressure control device 180 comprises a CPU 182, a ROM 184, a RAM 186, an input section 188 and an output section 190. The ROM 184 memorizes the multi-type failure detection routine shown in the flow chart of FIG. 5, the normal brake pressure control routine (brake power characteristic routine) shown in the flow chart of FIG. 8, the related failure brake pressure control routine shown in the flow chart of FIG. 7, the flow control valve control routine and the anti-lock control routine, etc. Each of these routines is carried out by the CPU 182 using the RAM 186.

The brake power characteristic control means that the brake power characteristic which has the relation between the brake operating power and the vehicle deceleration is controlled so as to increase the vehicle deceleration in the same proportion of the brake operating power in spite of a decrease in the power of the booster 12. It can be referred to as the brake power assist control because it can assist the brake power when the booster 12 reaches the limitation point of the brake. It also can be referred to as the servo power control, because the servo ratio is controlled.

A master cylinder pressure sensor 200, 201, a stroke sensor 202, a pedal power sensor 203 and a wheel speed sensor 204 are connected to the input section 188 of the fluid pressure control device 180. The master cylinder pressure sensor 200, 201 is disposed in each of the main fluid paths 64 of the main fluid path 64 of the front wheel side and the rear wheel side, and it detects the fluid pressure of the two pressure chambers of the master cylinder 14, respectively. The stroke sensor 202 detects the stroke of the brake pedal 10, and the pedal power sensor 203 detects the operation power of the driver given to the brake pedal 10. These stroke sensors 202 and the pedal power sensor 203 detect the operating amount of the brake pedal 10, and correspond to the brake operating amount detector. In addition, in this embodiment, a fluid pressure source device 206 comprises the booster 12, the master cylinder 14, the first compressing device 150, the second compressing device 152 and the control valves 100, 110. The master cylinder pressure sensor 200, 201 corresponds to the fluid source pressure detector which detects the fluid pressure of the fluid pressure source device 206. In this embodiment, the failure is detected based on the detected fluid pressure by the master cylinder pressure sensor 200 disposed in the brake system on the front wheel side. The brake power of the brake of the front wheel side is larger, therefore, the necessity of detecting its failure is high.

A wheel speed sensor 204 is provided in each wheel, and outputs the wheel speed signal of each wheel. The brake slip condition and the wheel acceleration, etc., are calculated based on the wheel speed of each wheel, and the antilock control, etc., are performed based on that. In the anti-lock brake control, the pressure holding valve 100 and the decompression valve 110 are controlled such that the fluid pressure of the brake cylinders 56, 60 is controlled so that the braking slip condition of the wheel may be kept in the proper condition.

On the other hand, a motor controller 208, a drive control circuit 210, 212 and an informing device 214 are connected to the output section 190 of the fluid pressure control device 180. The pump motor 76 is connected to the motor control through a drive control circuit, which is not illustrated. The pump motor 76 is controlled by the drive control circuit based on commands from the motor controller 208.

The coil 84 of the pressure control valve 70 is connected to the drive control circuit 210, and each coil of the pressure holding valve 100, the decompression valve 110, the flow control valve 132 and the sub flow control valve 142 is connected to the drive control circuit 212. The electric current control signal which controls the magnetic power of the coil 84 linearly is output in the drive control circuit 210 of the coil 84 of the pressure control valve 70, the ON/OFF driving signal for driving the ON/OFF control of the coil is output to the pressure holding valve 100 and the decompression valve 110, the flow control valve 132 and the drive control circuit 212 of each coil of the sub flow control valve 142 respectively.

The informing device 214 is operated based on the type of failure, and the driver is informed of the type of the failure by the operation of the informing device 214. The informing device 214 contains, for example, a warning sound generating device which generates a voice message or a buzzer, and can also contain an indication device which has an indication display or a warning lamp and so on. In the case of the indication in the indication display or the voice message, the type of the failure can be informed. In the case of the buzzer or the lamp, the type of the failure can be informed by changing the flashing pattern of the warning lamp, changing the frequency of the buzzer sound or changing the occurrence pattern corresponding to the type of flashing of the warning lamp. The informing device 214 can indicate not only the type of the failure but also the occurrence of the failure itself.

It is now explained the brake power characteristic control that is done in this brake device. In this embodiment, when the booster 12 reaches the limitation point of brake power assistance, the pressure increasing stage of the brake cylinder 56 by the pump 74 is started. In other words, as shown in FIG. 4, when the master cylinder fluid pressure (hereafter abbreviated to the "master pressure") PM reaches the master pressure PMB (it is limitation pressure of brake power assistance, hereafter abbreviated to the "start pressure") the booster 12 reaches the limitation point of brake power assistance, the pressure increasing stage is started, the target pressure P* is decided so that the servo ratio may be kept at a constant both before and after reaching the limitation point of brake power assistance and the assistance pressure $\Delta P$ is added.

Figure 4:
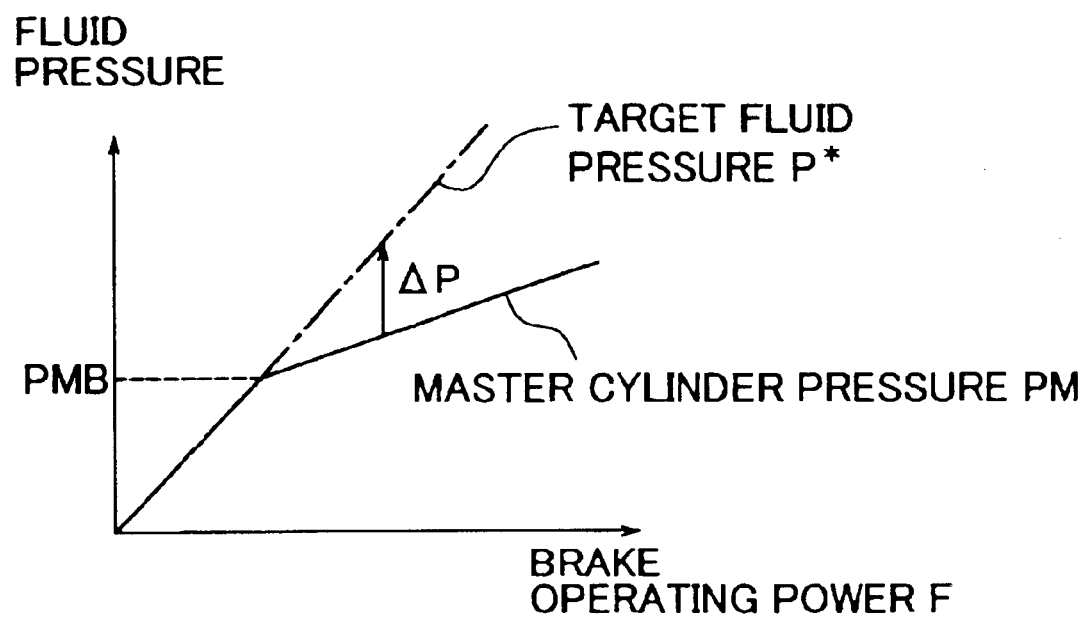
FIG. 4 shows the relation between the master pressure controlled by the fluid pressure control device contained in the above brake device, and the assistance power (the target pressure difference).

When the servo ratio is held constant, as shown in FIG. 4, the assistance pressure (the target pressure difference) $\Delta P$ is increased corresponding to the increasing of the master pressure PM, therefore, the assistance pressure $\Delta P$ is determined by the master pressure PM. In other words, if the pressure control valve 70 is controlled in order to control the assistance pressure (the target pressure difference) $\Delta P$, the brake cylinder fluid pressure (hereafter abbreviated to the "brake pressure") can be controlled so as to be a higher pressure than the master pressure PM by the assistance pressure $\Delta P$, the brake fluid pressure can be approached to the target fluid pressure when the brake operating force is multiplied by the servo ratio. Furthermore, as above mentioned, the magnetic power (in this embodiment, it corresponds to the attraction force) by the coil 84 is increased by the amount of current, the predetermined relations between the attraction force and the pressure difference (assistance pressure $\Delta P$) are satisfied. Therefore, the supplying electric current value I of the coil 84 can be determined based on the assistance pressure $\Delta P$, and the amount of supplying electric current can be determined based on the master pressure or the brake operating force.

In this embodiment, the determined supplying electric current is based on the brake operating force, but it also can be determined based on the master pressure.

Figure 8:
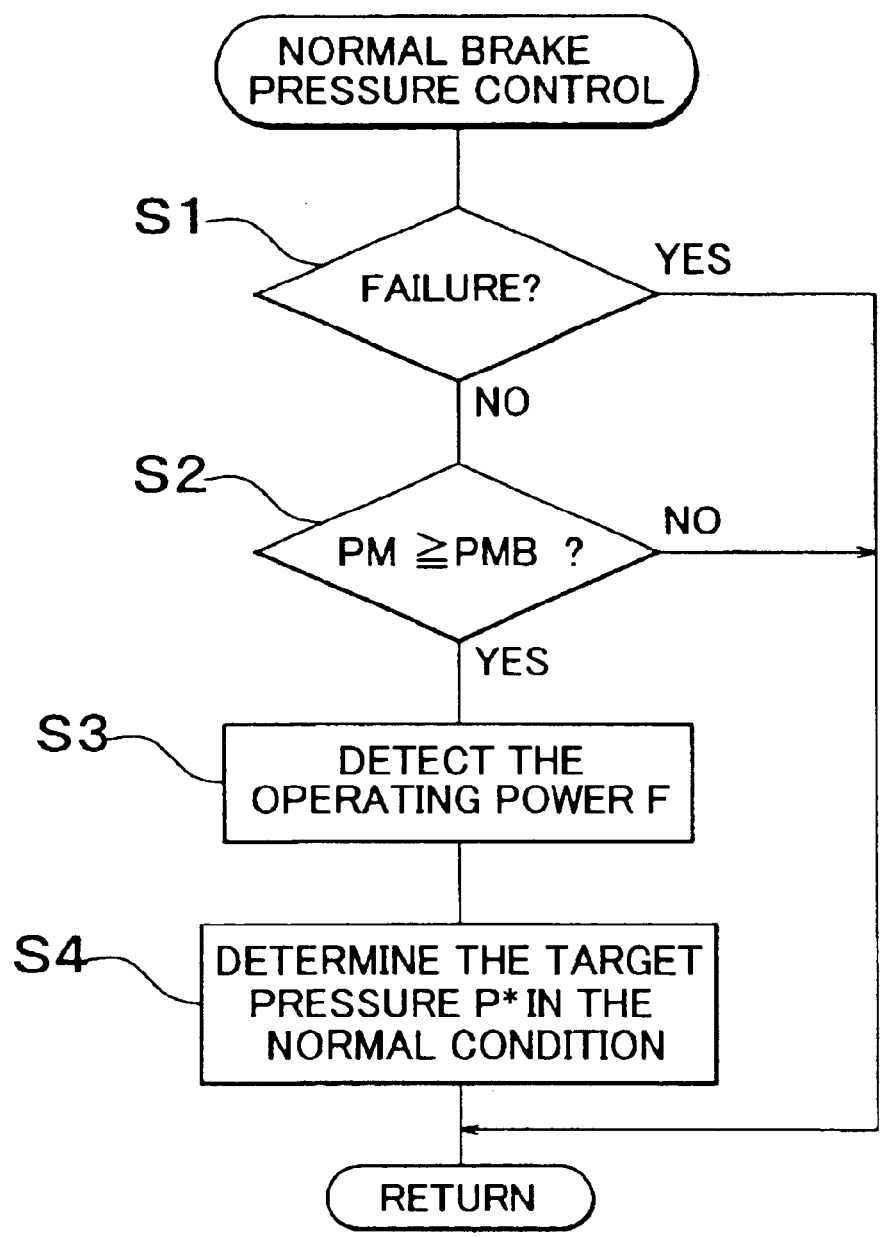
FIG. 8 is a flow chart which shows the normal brake pressure control routine stored in the ROM of the above fluid pressure control device.

The routine shown in the flow chart of FIG. 8 is carried out repeatedly during the brake operation. In step S1 (hereafter expressed as "S1"; the same type of abbreviation is used for other steps as well), it is judged whether the brake device is in the normal condition. When it is in the failure condition, the step S2 or the steps after step S2 are never carried out. As for the detection of the failure condition and the control of the failure condition, they are described later.

When not in the failure condition, the judgment in step S1 becomes NO, and it is judged whether the master pressure PM is higher than the start pressure PMB in step S2. When it is higher than the start pressure PMB, the judgment becomes YES, and the pedal power F detected by the pedal power sensor 203 is read in step S3, and in step S4, the target pressure P* is determined as shown in the graph of FIG. 4. In step S4, the assistance pressure $\Delta P$ is calculated based on the target pressure P* and the actual master pressure PM, and the supplying electric current I of the coil 84 of the pressure control valve 70 is determined based on the assistance pressure $\Delta P$.

In the limited assistance power control, as described, since the brake fluid pressure is increased higher than the master pressure, the operated fluid is supplied to the brake cylinders 56, 60 by the first compressing device 150. The flow control valve 132 is changed to the open condition, the sub flow control valve 142 is changed to the closed condition, the operating fluid of the master cylinder 14 is drawn, compressed and supplied by the pump 74. The brake fluid pressure approaches to the target pressure by controlling of the pressure control valve 70.

The following is an explanation of the detection of the failure. In this embodiment, several types of failures, the servo function failure of booster 12 and the fluid leakage failure (a large amount of fluid leakage failure and a small amount of fluid leakage failure) is detected distinctively. The failures are detected in accordance with the operation of the multi-type failure detection routine shown in the flow chart of FIG. 5, the failure detection is done based on the fact mentioned in the table in FIG. 6.

Figure 9:
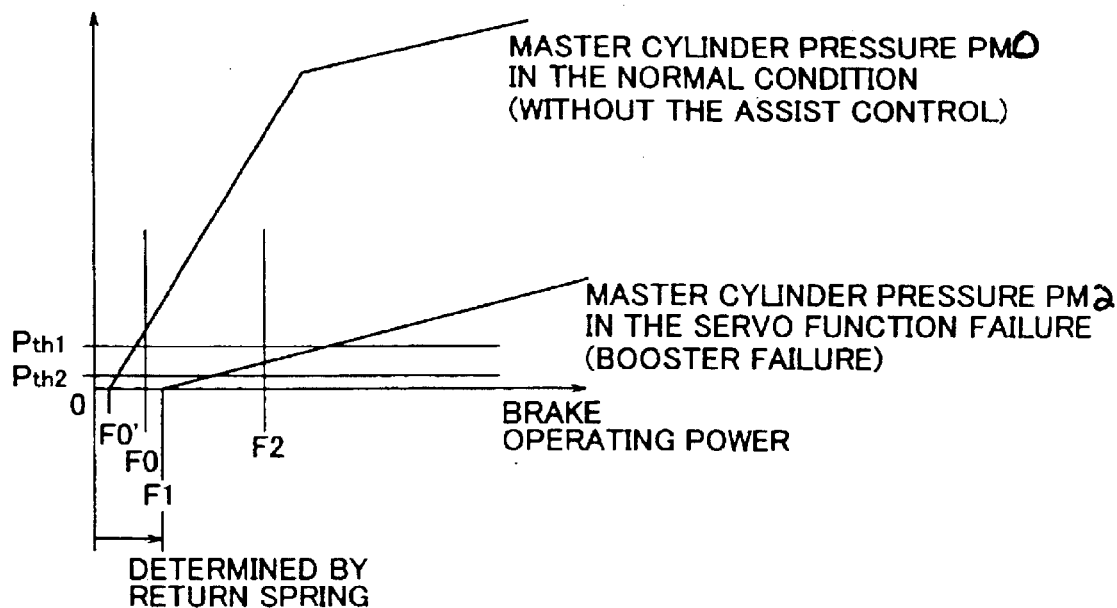
FIG. 9 shows the relation between the operation power and the master pressure of the brake pedal in the above brake device.

As shown in FIG. 9, if the master pressure PM0, at the time that the brake operating power is the first predetermined operation power F0, becomes higher than the first predetermined fluid pressure Pth1, it is the normal condition or the small amount fluid leakage failure (without the assist control). If the master pressure PM0 becomes smaller than the first predetermined fluid pressure Pth1, it is the servo function failure or the large amount leakage failure (booster failure).

In this embodiment, the first predetermined operation power F0 is decided based on, for example, the set load of the return spring which is contained in the booster 12 and the master cylinder 14, etc. When the brake device is in the normal condition, the first predetermined fluid pressure Pth1 is made a smaller value than the master pressure at the time that the operation power is the first predetermined operation power F0. The normal condition includes the case that a small amount of fluid leakage is occurring.

When the booster 12 is in the normal condition, the brake operating power and the assistance power of the booster 12 are added to the output member in the booster 12, and the output of the output member is added to the pressure piston in the master cylinder 14. In the booster 12, if the brake operating power added to the input member 13 through the brake pedal 10 becomes larger than the power based on the set load of the return spring of the input member 13, the input member is moved against the power of the return spring, the control valve is placed in the operating condition, and the power piston generates the assistance power. In the master cylinder 14, if the output power added to the pressure piston becomes bigger than the power based on the set load of the return spring of the master cylinder 14, the pressure piston is moved against the power of the return spring, and the fluid pressure is generated in the pressure chamber.

On the contrary) when the booster 12 is in the failure condition, the power added to the pressure piston corresponds to the brake operation power because the power piston may not generate the assistance power. When the power added to the input member is bigger than the set load of the return spring of the power piston (in general, the set load of the return spring of the input member is much smaller than the set load of the return spring of the power piston and it can be ignored), the power piston is moved, and when the power added to the pressure piston becomes larger than the set load of the return spring of the master cylinder, the power piston is moved and the fluid pressure is generated in the pressure chamber.

Clearly by the above explanation, when the booster 12 is in the normal condition, if the power added to the pressure piston (the brake operation power by the driver and assistance power by the booster 12) is beyond the set load of the return spring of the master cylinder 14 (F0', FIG. 9), the fluid pressure is generated in the pressure chamber, and in the case of the servo function failure, while the power (the brake operated power) added to the pressure piston is smaller than the set load of the return spring of the master cylinder 14, the fluid pressure is not generated in the pressure chamber. Therefore, if the value between these powers is determined to be the first predetermined operation power F0, and the first predetermined fluid pressure Pth1 is determined to be a smaller value from the master cylinder pressure in the brake device of the normal condition, failure of the booster 12 and a large amount of fluid leakage can be detected surely based on whether the detected master pressure is greater than the first predetermined fluid pressure Pth1 or not. The first predetermined operation power F0 and the first predetermined fluid pressure Pth1 can be referred to as the servo function failure judgment operation power and the servo function failure judgment fluid pressure, respectively.

If the master pressure PM2 based on the second predetermined operation power F2 of the brake operation power is higher than the second predetermined fluid pressure Pth2, it can be the normal condition or the servo function failure, if it is smaller than that, it can be the fluid leakage failure because the bottoming failure condition can be caused by the fluid leakage, but not by the servo function failure.

The second predetermined operation power F2 is smaller than the corresponding operation power of the limitation point of the brake power assistance PMB of the booster 12, and the second predetermined operation power F2 generates a big enough master pressure when the bottoming condition has not occurred, the predetermined fluid pressure Pth2 is a very small value. The reason the second predetermined operation power is smaller than the corresponding operation power of the limitation point of the brake power assistance PMB of the booster 12 is that it is desired that the failure condition should be detected while the brake fluid control is not performed.

The bottoming condition β is the condition in which, in the master cylinder 14, (1) the front pressure piston of the two pressure pistons is contacted to the stopper 19 of the master cylinder 14 (it also may be the bottom part of the master cylinder), (2) the rear pressure piston is contacted to the front pressure piston 14a, or (3) both conditions (1) and (2) occur (the front pressure piston is contacted to the master cylinder and the rear pressure piston is contacted to the front piston).

Figure 10:
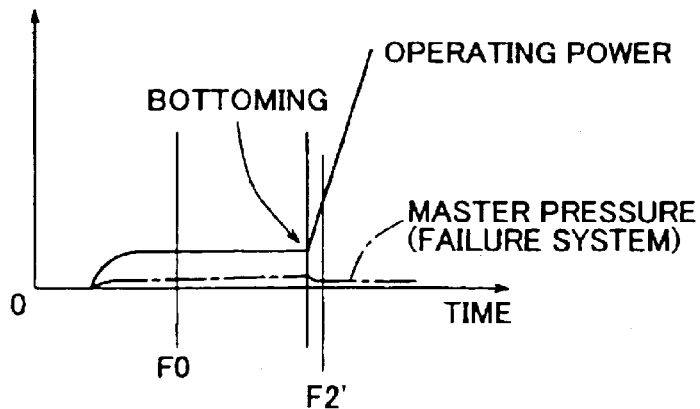
FIG. 10 shows the operation power and the condition of the change in the master pressure when large amount of fluid leakage failure is detected in the above brake device, respectively.
Figure 11:
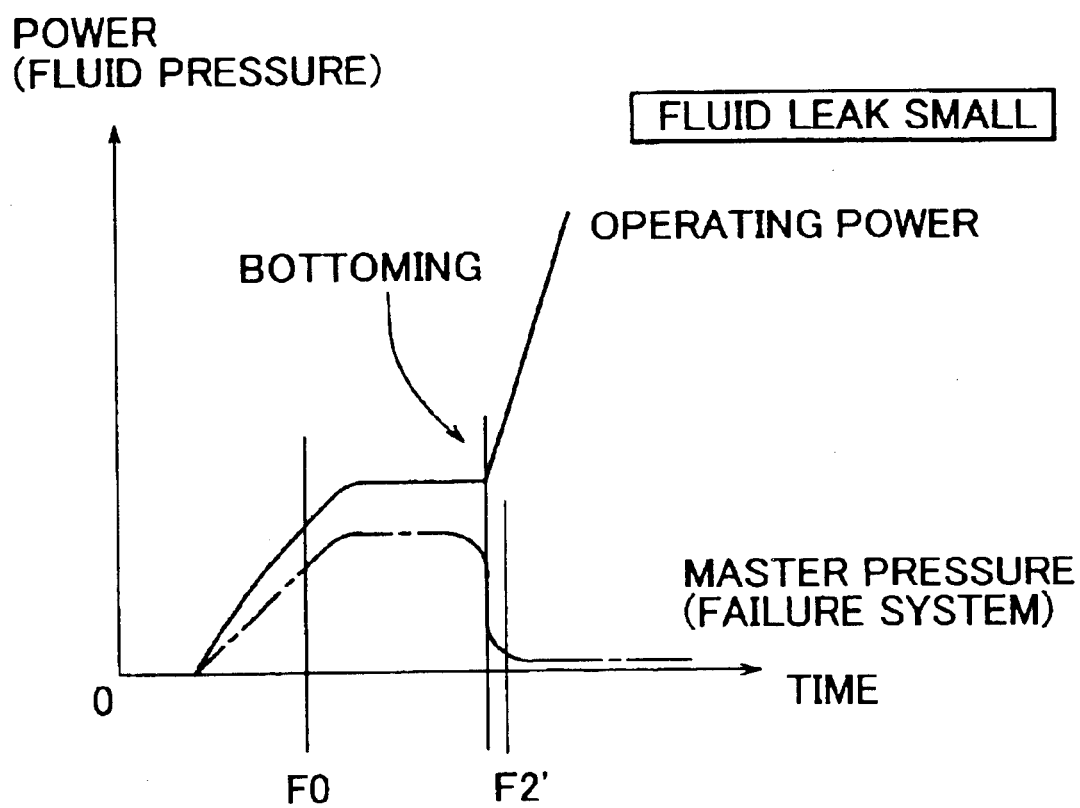
FIG. 11 shows the operation power and the condition of the change in the master pressure when a small amount fluid leak failure is detected in the above brake device, respectively.

Then, as shown in FIGS. 10 and 11, during the occurrence of fluid leakage the fluid pressure of the master cylinder of the brake system is decreased to a very small value (almost 0), and it is decreased to a value smaller than the second predetermined fluid pressure Pth2. On the other hand, as shown in the FIGS. 10 and 11, when the servo function failure occurs, the master cylinder pressure becomes a higher value than the second predetermined fluid pressure Pth2. Since the fluid pressure corresponding to the brake power is generated in the master cylinder 14, the fluid pressure never decreases so much.

The second predetermined operation power F2 and the second predetermined fluid pressure Pth2 can be referred to as the fluid leakage failure judgment operation power and the fluid leakage failure judgment fluid pressure respectively, and they can be referred to as the brake system failure judgment operation power and the brake system failure judgment fluid pressure, respectively. The main reason of the brake system's failure is the fluid leakage.

Furthermore, the bottoming condition may happens because of the fluid leakage, but the bottoming condition does not cause the fluid leakage. If the fluid leakage causes the bottoming condition; therefore if the bottoming condition is detected then the fluid leakage can be detected. As described above, the bottoming condition can be detected, even if the master pressure is a very small value, in spite of that the brake operation power is big, but, as shown in FIG. 12, it also can be detected based on the changing condition of the operating power, the stroke, the master pressure and the pressure of the vacuum chamber (hereafter abbreviated to the "booster pressure").

As shown in (a) of FIG. 12, when the bottoming condition occurs (when either of ①–③ occurs), the operating power becomes large rapidly. The reaction power added to the pressure piston corresponding to the operating power becomes large, but if the master pressure becomes small rapidly because of the bottoming condition, it is common that the operation power is increased rapidly by the driver. Therefore, when the increasing gradient of the operation power is larger than the predetermined increasing gradient, the bottoming condition can be detected. In addition, the bottoming condition can be detected based on the changing condition of the increasing gradient of the operation power. For example, it can be detected based on whether the increasing gradient of the operation power is larger than the predetermined value, or whether the increasing rate of the increasing gradient is larger than the predetermined ratio.

As shown in (b) of FIG. 12, when the bottoming condition occurs, the operation gradient of the stroke becomes very small. The amount of the operating stroke of that situation is beyond the amount of the usual brake operation. Therefore, when the amount of the stroke is larger than the predetermined stroke S0 and the changing gradient of the stroke is very small, it can be determined that the bottoming condition has occurred. In addition, this occurrence of the bottoming condition can be detected distinguishably from the situation in which the driver keeps the operation stroke of the brake pedal 10 constant during the brake operation.

When the bottoming condition is detected, the two pressure pistons are contacted to each other in the master cylinder 14, and the front pressure piston is contacted with the body etc. of the master cylinder 14 (the above mentioned situation ③). The stroke does not increase further, it is kept in that value, but when the rear pressure piston is contacted to the front pressure piston, or when the front pressure piston is contacted to the body etc. of the master cylinder, the stroke increases slightly. But in this situation, the increasing gradient becomes very small.

As shown in (c) of FIG. 12, when the bottoming condition occurs, the pressure of the vacuum chamber 12a of the booster 12 (the booster pressure) approaches the vacuum pressure changed from the approaching the atmospheric pressure even if the operation power added to the brake pedal is on the increasing state. The booster pressure is approached to the atmospheric pressure by the stroke operation of the operation of the brake pedal 10, if the operation stroke is kept at the constant, the booster pressure is approached to the vacuum pressure. In addition, the situation in which the operation stroke is kept at the constant is the situation that the brake operation power is released by the driver, and the bottoming condition can be detected distinguishably from the above situation based on the changing situation of the booster pressure while the brake operation power is increasing.

The bottoming condition is not that in which the two pressure pistons are contacted with each other in the master cylinder 14 and the front pressure piston is contacted to the body etc. of the master cylinder (the above mentioned case (① or ②), the booster pressure does not approach the vacuum pressure at once because of the bottoming condition, the approaching speed to the atmospheric pressure becomes small, or the booster pressure is sometimes kept at the constant pressure. In these cases, when the bottoming condition occurs, it changes from the former condition to the other condition in which the booster pressure approaches to the vacuum pressure.

As shown in (d) of FIG. 12, in the brake system in which the fluid leakage is not occurring, when the bottoming condition occurs, the master pressure is increased rapidly based on the increasing of the brake operation power. As shown in (e) of FIG. 12, in the brake system which the fluid leakage is occurring, the master pressure is decreased rapidly. Therefore, if the decreasing gradient of the master pressure is larger than the predetermined decreasing gradient, the bottoming condition can be detected. Also, when the decreasing gradient of the master pressure is larger than the predetermined gradient in the bottoming condition and the amount of the fluid leakage is small, it is not always larger than the predetermined gradient when the amount of the fluid leak is large because, as shown in FIGS. 11 and 12, the master pressure is also very small before the bottoming condition when the amount of the fluid leakage is large.

In this embodiment, the bottoming condition is detected based on these facts. The bottoming condition can be detected if at least one of (a)–(e) is satisfied, but the bottoming condition also can be detected if two of (a)–(e) are satisfied. In this case the accuracy of detection of the bottoming condition can be improved.

In addition, in this embodiment, the servo function failure which occurs in the brake operating state also can be detected. As shown in FIG. 13, when the servo function failure occurs during the brake operation, the master pressure decreases rapidly, and the increasing gradient of the brake operation power becomes large, the phenomenon which is the same as the bottoming condition occurs (the quasi-bottoming condition). However, when the servo function failure occurs during the brake operation, it is common that both the decreasing gradient of the master pressure and the increasing gradient of the operation power are smaller than the case in which the bottoming condition occurs. As described above, the increasing gradient of the operation power and the decreasing gradient of the master pressure during the bottoming condition of the case in which one of the pressure pistons is contacted (the case ① ②) is smaller than the case in which the two pistons are contacted with each other and the front pressure piston is contacted to the master cylinder itself etc. (③). Therefore, in this embodiment, the threshold value of the changing condition to detect the bottoming condition is a predetermined small value, and both the bottoming condition and the servo function failure during the brake operation are detected.

On the other hand, as shown in FIG. 13, the master cylinder PM2 during the servo function failure is not lower than the value shown with a solid line, and the master pressure PM2 at the time the operation power is the second predetermined operation power F2 never becomes smaller than the second predetermined fluid pressure Pth2. Therefore, it can be detected distinguishably between the servo function failure and the bottoming condition during the brake operation.

Figure 5:
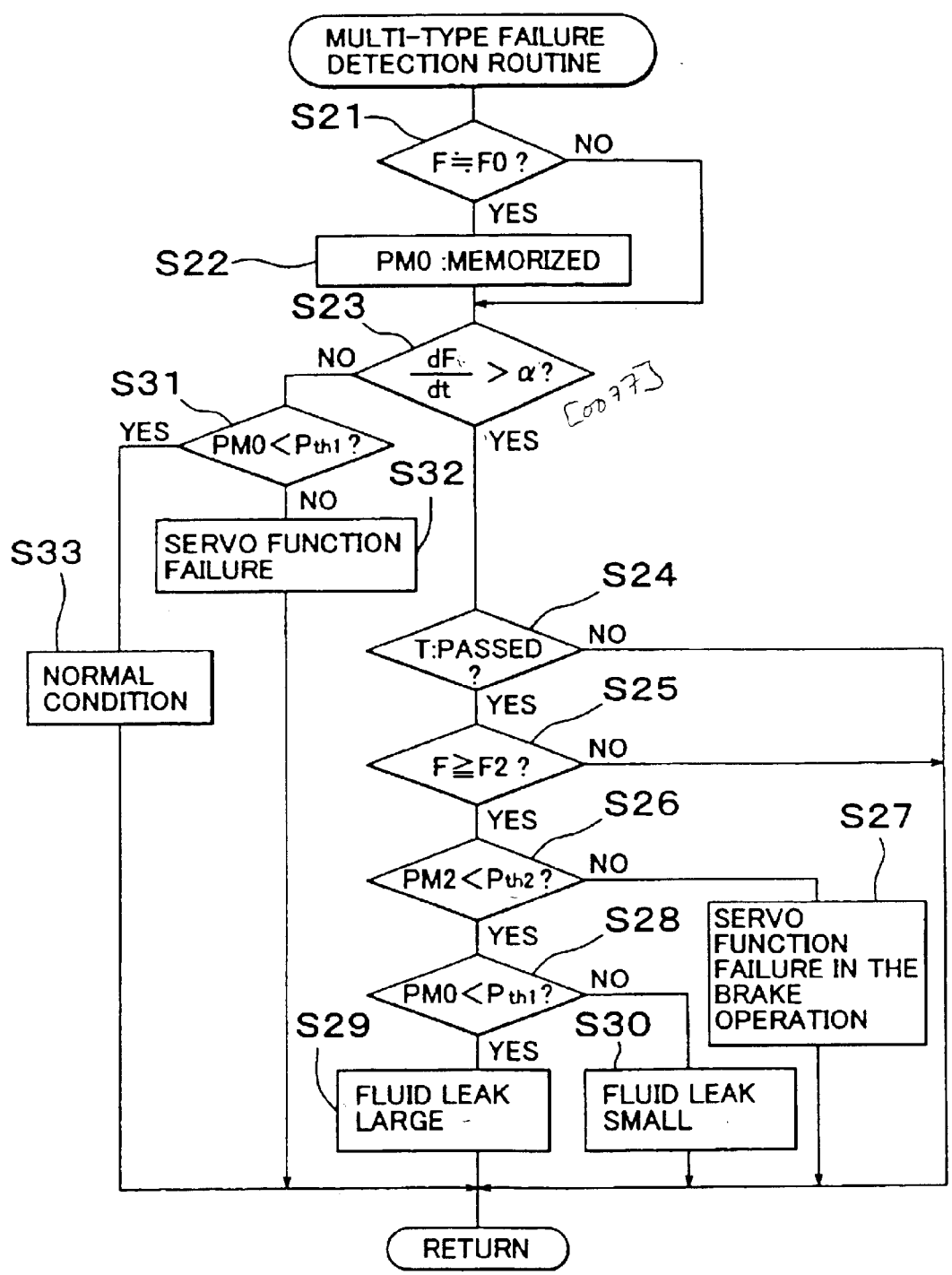
FIG. 5 is a flow chart which shows the multi-mode failure detection routine that is stored in the ROM of the above fluid pressure control device.

The multi-type failure detection routine shown in the flow chart in FIG. 5 is carried out repeatedly during the brake operation. In step S21, it is judged whether the pedal power detected by the pedal power sensor 203 is larger than the first predetermined operation power F0. When it is larger than the first predetermined operation power F0, the judgment becomes YES, and the master pressure PM0 at that time is read in step S22, and memorized in RAM. When it is smaller than the first predetermined operation power F0, the judgment of step S21 is done repeatedly until the detected pedal power is increased to F0.

Next, in step S23, it is judged whether the increasing gradient of the operation power is larger than the predetermined increasing gradient α. This judges whether it is the bottoming condition β or the quasi-bottoming condition. When the increasing gradient of the operation power is larger than the predetermined increasing gradient, in step S24, it is judged whether the passing tune after the above condition is satisfied is beyond the predetermined time. If the passing time is shorter than the predetermined time, the judgment becomes NO, and it is returned to step S21, and from step S21 to step S24 are carried out repeatedly until the passing time is beyond the predetermined time T.

When it passes the predetermined time T after the judgment in step S23 becomes YES, the judgment in step S24 becomes YES, and it is judged whether the operation power is larger than the second predetermined operation power F2 in step S25. When it is larger than the second predetermined operation power F2, the master pressure is read in step S26, and it is judged whether the master pressure PM2 is smaller than the second predetermined fluid pressure Pth2. When it is higher than the second predetermined fluid pressure Pth2, the judgment becomes NO, and in step S27, it detects that the servo function failure occurs during the brake operation, when it is smaller than the second predetermined fluid pressure Pth2, it detects that it is the fluid leakage failure. In this case, the actual bottoming condition is detected, it is judged whether the master pressure PM0 is smaller than the first predetermined fluid pressure Pth1 in step S28. When it is smaller than the first predetermined fluid pressure Pth1 in step S29, it is determined to be a large fluid leakage failure, when it is higher than the first predetermined fluid pressure Pth1, it is determined to be a small fluid leakage failure in step S30.

On the other hand, when the condition of step S23 in not satisfied, the judgment becomes NO, and it is judged whether the master pressure PM0 memorized in step S22 is larger than the first predetermined fluid pressure Pth1 in step S31. When it is smaller than the first predetermined fluid pressure Pth1, the judgment becomes NO, and it is determined that a servo function failure occurred in step S32. When the master pressure PM0 is larger than the first predetermined fluid pressure Pth1, the judgment becomes YES, and it is determined that the normal condition occurred in step S33. When the failure is detected, the flag corresponding to the type of the failure (the servo function failure, the small amount leakage failure and the large amount leakage failure) is set.

As described, in this embodiment, several types of failures are distinguished based on the operation power as the amount of the brake operation and the master pressure as the pressure of the fluid pressure source device and so on. It can detect either of the servo function failure, the small amount fluid leakage failure and the large amount fluid leakage failure. Since the failure of the front wheel side is detected based on the fluid pressure of the pressure chamber which is connected to the brake system of the front wheel side (the detected fluid pressure by the master cylinder pressure sensor 200), it can detect the failure of the front wheel side precisely. The multi-types failure detection program can be carried out during the non-brake control period only. The brake fluid pressure is controlled by the different condition based on the type of failure.

Figure 7:
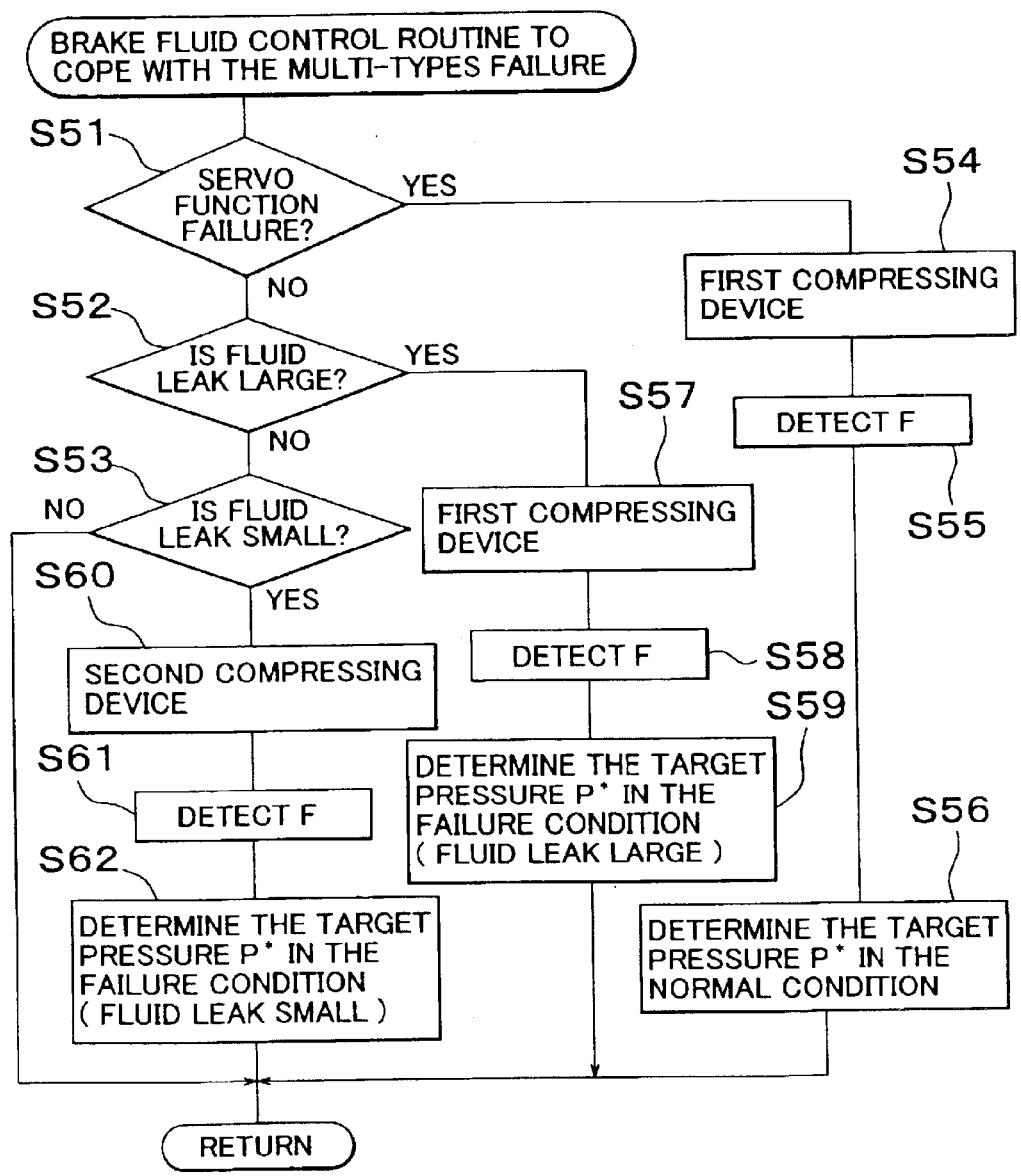
FIG. 7 is a flow chart which shows the failure related brake pressure control routine that is stored in the ROM of the above fluid pressure control device.

The brake control routine to cope with the multi-type of failure shown in the flow chart of the FIG. 7 is carried out repeatedly during the brake operation. It is judged whether the servo function failure occurs or not in step S51, it is judged whether the large amount fluid leak failure occurs or not in step S52 and it is judged whether the small amount fluid leak failure occurs or not in step S53. It is judged whether the flag corresponding to each of the failures is set or not. When it is the normal condition, all flags are in a reset state and all the judgments from step S51 through step S53 are NO. In this case, the pressure control valve 70 is controlled based on the operation of the above mentioned normal condition brake fluid pressure control routine. If the judgment of either of step S51 through step S53 becomes YES, the informing device 214 is operated based on the type of the failure.

If the servo function failure is detected, the judgment of step S53 becomes YES, the brake fluid pressure is controlled by the first compressing device 150 in step S54 through step 556. The target pressure P* is set when the servo ratio is constant. It is set to the value of the booster 12 in the normal condition, or after the booster 12 reaches the limitation point of the brake power assistance, it is set to the value which is determined by the normal condition brake control, hereafter abbreviated to the target pressure of the normal condition. When the servo function failure occurs, the master pressure becomes smaller, but since the fluid leakage does not occur, the brake fluid pressure can be controlled to the same value of the target fluid pressure P*.

The target fluid pressure P* in the servo function failure can be set to the smaller value than the target fluid pressure in the normal condition. If the brake fluid pressure is set to the smaller value than the normal condition, the failure of the brake device can be informed to the driver surely.

If the large amount fluid leakage is detected, the judgment becomes YES in step S52, and in step S57 through step S59, the brake fluid pressure is controlled by the first compressing device 150. In this case, the target fluid pressure is set to a value higher than in the normal condition. The reason why the first compressing device 150 is selected is that a large amount of operating fluid is consumed when the fluid leakage is the large amount, if the second compressing device 152 is selected, the large amount of the operating fluid of the master reservoir 136 is consumed.

In this embodiment, when the fluid leakage of the front wheel side is detected, the target fluid pressure P* of the rear wheel side can be set to the maximum value. If the brake fluid pressure of the rear wheel side is controlled to the maximum value, it can prevent the shortage of the brake power of the whole vehicle.

When the small amount fluid leakage failure is detected, in step S60 through step S62, the second compressing device 152 is selected, the target fluid pressure is set to a value higher than the normal condition and to a value smaller than the large amount fluid leakage failure condition. If the second compressing device 152 is selected, the large amount of the operating fluid can be supplied from the master reservoir 136, it can reduce the delay of the pressure increase of the brake fluid.

As described, in this embodiment, since the type of the failure is detected distinctively, the brake fluid pressure is controlled based on the type of the failure and the brake pressure car be appropriately controlled based on the type of the failure. Since the informing device 214 is operated based on the type of the failure, the driver can recognize the type of the failure based on the operation of the informing device 214.

As described above, in this embodiment, the failure detection device is constructed by the memorized and operated part of the multi-type failure detection routine in the flow chart in FIG. 5 of the fluid pressure control device 180 and, the brake fluid pressure control device is constructed by the memorized and operated part of the brake fluid control of the multi-type failure routine in the flow chart of FIG. 7.

In the failure detection device, the bottoming detection device is constructed by performing step S23 with the fluid pressure control device 180 and, in the brake fluid pressure control device, the leak amount control device is constructed by the memorized and operated part of steps S58, S59, S61 and S62 of the brake fluid pressure control device, and the brake operating condition determining device is constructed by the memorized and operated part of steps S54, S57 and S60.

In the above described embodiment, although it is judged whether the increasing gradient of the brake operating power is larger than the predetermined increasing gradient in S23, it also can be judged whether the decreasing gradient of the master pressure is larger than the predetermined increasing gradient, or whether the changing gradient of the stroke is very small or not, or whether the booster pressure approaches the vacuum pressure or not. It also can be judged whether two of the above mentioned conditions are satisfied or not. If it is judged based on the changing condition of the stroke or the changing condition of the booster pressure, in step S23, the judgment becomes NO when the servo function failure is occurring. In this case, it can distinguish the normal condition from the servo function failure in the brake operation based on the decreasing gradient of the master pressure. If it is detected based on the decreasing gradient of the master pressure, the judgment becomes NO in the large amount fluid leak failure. In this case, if it is judged whether the master pressure PM2 of the second predetermined operation power F2 is larger than the second predetermined fluid pressure Pth2, it can distinguish the large amount fluid leakage failure from the servo function failure and the normal condition.

If it is judged based on the booster pressure, a pressure sensor to detect the pressure of the vacuum chamber 12a of the booster 12 should be provided.

The step S25 is not essential. If it is judged based on the master pressure which is the pressure when the time passed after the judgment of step S23 becomes YES reached the predetermined time T or after (the operation power F2'), it can be detected as either the bottoming condition or servo function failure.

Furthermore, the first predetermined operation power F0 and the second predetermined operation power F2 are not limited to the above-mentioned values. In FIG. 9, the first predetermined operation power is larger than the operation power F0' and smaller than the operation power F1, and the second predetermined operation power F2 is larger than the operation power F2' and smaller than the operation power corresponding to the assistance pressure PMB of the booster. In this case, the master pressure which is compared with the first predetermined fluid pressure Pth1 is set to the value where the operation power is larger than the operation power F0' shown in FIG. 9 and smaller than the operation power F1, the master pressure which is compared with the second predetermined fluid pressure Pth2 is set to the value where the operation power is larger than the operation power F2' shown in FIG. 9 and smaller than the operation power corresponding to the assistance pressure PMB.

In step S28, it can be judged whether the absolute value of the decreasing gradient of the master fluid pressure is larger than the predetermined value. If the absolute value of the decreasing gradient is larger than the predetermined value, it can detect the small amount fluid leakage failure.

Furthermore, it is not essential that the brake fluid pressure is controlled based on the type of the failure and the informing device is operated. If either of the brake fluid pressure control or the operation of the informing device is operated, it can enjoy the effect of this invention. It is not essential to include the informing device.

It can be detected by the operation of the multi-type failure detection routine shown in FIG. 14. In this case, the bottoming condition is not detected. It is detected based on the relation between the master pressure PM0 at the time when the operation power is the first predetermined operation power F0 and the master pressure PM2 at the time when the operation power is the second predetermined operation power F2.

If the master pressure PM2 at the time when the brake operation power is the second predetermined operation power F2 is smaller than the second predetermined fluid pressure Pth2 and if the master pressure PM0 at the time when the operation power is the first predetermined operation power F0 is smaller than the first predetermined fluid pressure Pth1, it is detected that the large amount fluid leakage failure occurred in step S76. If the master pressure PM0 is larger than the first predetermined fluid pressure Pth1, it is detected that the small amount fluid leakage failure occurred in step S77.

Furthermore, if the master pressure PM2 at the time when the brake operation is the second predetermined operation power F2 is higher than the second predetermined fluid pressure Pth2 and if the master pressure PM0 at the time when the operation power is the first predetermined operation power F0 is smaller than the first predetermined fluid pressure Pth1, it is detected that the servo function failure occurred in step S79. If the master pressure PM0 is higher than the first predetermined fluid pressure Pth1, it is detected that the normal condition occurred in step S80.

As described, the types of the failures can be detected distinctively without detecting the bottoming condition.

The applicable brake structure is not limited the above embodiment; it is applicable to other structures. For example, the pressure control valve 70 can be replaced with an electromagnetic opening and closing valve. In this case, the pressure of the brake cylinder 56 is controlled by changing the opening and closing state of the electromagnetic opening and closing valve.

The flow control value 132 can be replaced with an electromagnetic flow control valve which can control the flow rate based on the supplying current. In that case, the supplying flow rate to the brake can be controlled by controlling the flow rate of the operating fluid which flows through the electromagnetic flow control valve. In the small amount fluid leakage failure, if the allowable flow rate is increased, the supplying flow rate to the brake can be controlled.

Furthermore, the booster 12 need not be a vacuum booster; it can be replaced with a hydro-booster.

In addition to this, the brake device in which the various changes and improvements are applied can be the structure of the following embodiments. Each embodiment is divided into the clauses used in the claims, and the number is put to the each clauses, and it is described in form of quoting the number of other clauses if necessary. This is to make the understanding of this invention more easy, the technical feature and the combination described in this application are not limited to each of the following clauses. When more than one feature is described in one clause, all the features are not always used together, only the part of the features can be used.

(1) A brake device comprising a fluid pressure source device which generates a fluid pressure based on operation of a brake operating member, and that is actuated by the fluid pressure generated by the fluid pressure source, comprising:

a brake operating amount detector which detects the operating amount of the brake operating member, a fluid source pressure detector which detects the pressure generated in the fluid pressure source device, and a failure detector which detects the type of the failure distinctively of the brake device based on the pressure detected by the fluid source pressure detector and the amount of the brake operation detected by the brake operating amount detector.

In this brake device, the type of the failure in the brake device is detected distinctively based on the amount of brake operation and the pressure of the fluid pressure source device.

For example, since the conditions of the fluid pressure source device are different based on the type of the failure, the type of the failure is detected distinctively based on the pressure of the fluid pressure source device corresponding to the amount of the brake operation. Since the type of the failure is detected, the driver can be informed of the type of the failure. In this case, the informing device which is operated distinctively based on the type of the failure is disposed with the brake device.

The informing device contains, for example, a warning sound generator which generates a voice message or a buzzer. It can contain an indication device, which has an indication display or a warning lamp, and so on. The type of the failure is informed directly by the indication display or the voice message and so on. In the case of the buzzer or the lamp, the failure type can be informed by changing the flashing pattern of the warning lamp, changing the frequency of the buzzer sound or changing the occurrence pattern corresponding to the type of flashing of the warning lamp.

The fluid pressure source device can include, for example, ① a master cylinder which generates the fluid pressure corresponding to the input power, ②(a) the master cylinder and (b) a booster which increases the operation power of the brake operating member and outputs to the master cylinder, or ③ a compressing device which compresses the operated fluid and supplies the operated fluid to the brake. Furthermore, it can include a fluid pressure control valve which is provided between the brake cylinder and the master cylinder or between the brake cylinder and the compressing device. For example, the brake fluid pressure is controlled by controlling the fluid pressure control device or the compressing device.

The fluid source pressure detector can be a device which detects the output fluid pressure of the fluid pressure source device or a device which detects the fluid pressure in the fluid pressure source device. In the former case, the fluid pressure detected by the fluid source pressure detector is equal to the brake fluid pressure, but it is not always equal in the latter case. For example, if the fluid pressure source device contains the master cylinder and the fluid pressure control valve, the former case is that the fluid source pressure detector corresponds to a device which detects the fluid pressure of the fluid pressure control valve of the brake cylinder side, the latter case is that it corresponds to a device which detects the fluid pressure of the master cylinder.

The brake operating amount detector can be a device which detects the operating stroke of the brake operating member or a device which detects the operating power added to the brake operating member and so on. The fluid source pressure detector and the brake operating amount detector can be a device which detects the pressure of the fluid pressure source device directly, detects the brake operating amount directly or detects some kind of amount which is a counterpart of them, indirectly.

The failure detector detects the type of the failure based on at least one amount of the brake operation and at least one fluid source pressure. In this case, the fluid source pressure is desirable to be the counterpart of the amount of the brake operation (the output pressure of the brake operation), but it is not limited to this. For example, the fluid source pressure can be at least one value which is detected when the amount of brake operation is within a predetermined range. On the other hand, the amount of the brake operation can be at least one value which is detected when the fluid source pressure is within the predetermined range. Furthermore, the failure detector can be a device which detects the type of the failure based on a detected value of an amount of the brake operation itself or the fluid source pressure, the changing condition of these detected values, or both the detected values itself and the changing condition. The changing condition corresponds to the amount of the change, the gradient of change or the tendency of the change.

The type of the failure detected by the failure detector corresponds to failures in which the failure location is different from each other, the failure reason is different from each other or the level of the failure is different from each other when the failure reason is the same. The failures can be the failure in which the failure location is different, for example, the failure of the master cylinder, the failure of the booster, the failure of the fluid pressure control valve, the failure of the compressing device, the failure of the brake operating device, the failure of the brake cylinder, the failure in which the failure reason is different, the failure of the fluid leakage, the failure of the vacuum booster, the failure of the poor operation of the brake operation device, the failure in which the level of failure is different, the large amount fluid leakage failure, the small amount fluid leakage failure.

The failure detector can distinguish between at least two types of failures out of these failures; for example, one embodiment can distinguish between the failure of the vacuum booster, the large amount fluid leakage failure and the small amount fluid leakage failure is described in the detailed description of the invention.

(2) A brake device as in clause (1), further comprising a brake fluid control device which controls the brake fluid pressure in a different way based on the type of the failure detected by the failure detector.

In the brake device described in this clause, the brake pressure is controlled based on the detected type of the failure. Therefore, the brake pressure is controlled appropriately based on the type of the failure.

(3) A brake device as in clause (1) or (2), wherein the failure detector detects the type of the failure based on both the pressure detected by the fluid source pressure detector at the time when the amount of the brake operation detected by the brake operation amount detector is a first predetermined amount of operation, and the pressure detected by the fluid source pressure detector at the time when the amount of the brake operation detected by the brake operation amount detector is a second predetermined amount of operation which is larger than the first predetermined amount of operation.

It can detect the type of the failure based on more than two values, the amount of the brake operation and the pressure corresponds to the amount of the brake operation.

(4) A brake device as in any one of clauses (1)–(3), wherein the failure detector detects and distinguishes the type of the failure between the case in which the pressure detected by the fluid source pressure detector at the time when the detected amount of the brake operation is the second predetermined amount of operation which is smaller than the predetermined first predetermined amount of operation is smaller than the second predetermined pressure which is larger than the first predetermined pressure and the case when the pressure is larger than the second predetermined pressure, and if the pressure detected by the fluid source pressure detector at the time when the amount of the brake operation detected by the brake operation amount detector is the first predetermined amount of operation is smaller than the first predetermined pressure.

For example, if the pressure detected by the fluid source pressure detector at the time when the amount of the brake operation of the brake operating member is the first predetermined amount of operation is smaller than the first predetermined pressure, it can detect the occurrence of the failure of the brake device, but it is difficult to detect the type of the failure. In this case, it can detect the type of the failure based on whether the pressure of the fluid pressure source device at the time when the amount of the brake operation is the second predetermined amount of operation is smaller than the second predetermined pressure or not. One embodiment of this is described in the next clause.

(5) A brake device as in clause (3) or (4), wherein the fluid pressure source device includes ① a master cylinder which generates the fluid pressure corresponding to the input power, and ② a booster which increases the operation power of the brake operating member and outputs to the master cylinder, the fluid source pressure detector includes a master cylinder pressure detector which detects the pressure of the master cylinder or the connected portion of the master cylinder, and the failure detector detects the failure of the booster if the pressure of the master cylinder at the time when the amount of the brake operation is the second predetermined amount of operation is larger than the second predetermined pressure, and detects the failure of the fluid leakage of the brake device if the pressure of the master cylinder at the time when the amount of the brake operation is the second predetermined amount of operation is smaller than the second predetermined pressure.

In this case, the second predetermined amount of operation is set to a value, for example, in which the master cylinder pressure becomes high enough unless the bottoming condition occurs, and the predetermined pressure is set to a very small value (almost 0). The predetermined amount of operation is set to a value which is much larger than the operation value when the bottoming condition occurs because of the failure of the fluid leakage. The bottoming condition is explained below.

Both in the booster function failure and in the large amount of the fluid leakage failure, the detected master pressure corresponding to the first determined amount of the operation is smaller than the first predetermined pressure. If the bottoming condition occurs because of the fluid leakage, the pressure of the master cylinder becomes almost 0. If the booster function failure occurs (the bottoming condition does not occur), the pressure does not become so small. When the booster function failure occurs, and the brake operation power is not enlarged and the power is output to the master cylinder, the power corresponding to the brake operation power is generated in the master cylinder. Therefore, it can detect and distinguish between the booster function failure and the large amount fluid leakage failure based on this fact.

The fluid source pressure detector can be a device which detects the fluid pressure of the pressure chamber in the master cylinder directly or detects the fluid pressure of the connected portion, for example, the fluid path expanded from the pressure chamber of the master cylinder. If the device detects the pressure of the fluid path, it can be set close to the master cylinder or the wheel cylinder. The counterpart of the fluid pressure of the master cylinder can be used by the device.

(6) A brake device as in any one of clauses (3)–(5), wherein the fluid pressure source device includes ① a master cylinder which generates the fluid pressure corresponding to the input power, and ② a booster which enlarges the operation power of the brake operation member and outputs to the master cylinder, the fluid source pressure detector includes the master cylinder pressure detector which detects the pressure of the master cylinder or the connected portion of the master cylinder, the brake operating amount detector includes an operating power detector which detects the power added to the brake operating member, the failure detector detects the normal condition when the pressure detected by the master cylinder pressure detector at the time when the detected brake operating power is the second predetermined amount of operation is larger than the second predetermined pressure and the pressure at the time when the detected brake operating power is the first predetermined amount of operation is larger than the first predetermined pressure, and detects the booster function failure at the time when the pressure detected by the master cylinder pressure detector is smaller than the first predetermined pressure.

The first predetermined amount of operation can be, for example, a comparatively small value at the beginning of the brake operation, and an amount of the operation power which generate the pressure in the master pressure in the normal condition of the booster but does not generate the pressure in the failure condition of the booster. The first predetermined pressure can be a value smaller than the maximum value which is generated in the master cylinder in almost the normal condition of the brake device (the small amount fluid leakage condition can be the normal condition). The first predetermined amount of the operation can be decided based on, for example, the set load of the return spring in the brake operating member, the booster, the master cylinder and so on.

When the booster is in the normal condition, the brake operating power and the assistance power of the booster is supplied to the output member of the booster, and the output power of the output member is supplied to the pressure piston of the master cylinder. In the booster, when the brake operating power which is supplied to the input member from the brake operating member becomes larger than the set load of the return spring of the input member, the input member is forwarded against the power of the return spring, and the control valve is operated and the assistance power is generated by the power piston.

In the master cylinder, the output power which is supplied to the pressure piston from the power piston is larger than the set load of the return spring of the master cylinder, the pressure piston is forwarded against the power of the return spring, and the fluid pressure is generated in the pressure room.

On the other hand, when the booster is in a failure condition, since the assistance power is not generated by the power piston, the power which is supplied to the pressure piston corresponds to the brake operating power. When the power which is supplied to the input member becomes larger than the set load of the return spring of the power piston (in general, the set load of the return spring of the input member is much smaller than the set load of the return spring of the power piston), the power piston is moved, and if the power which is supplied to the pressure piston is larger than the set load of the return spring of the master cylinder, the pressure piston is moved and the fluid pressure is generated in the pressure chamber.

As is clear from the above explanation, when the booster is in the normal condition, if the power which is supplied to the pressure piston of the master cylinder (the sum of the brake operating power by the driver and the assistance power of the booster) is beyond the set load of the return spring of the master cylinder, the fluid pressure is generated in the pressure chamber of the master cylinder, but when the booster is in the failure condition, if the power which is supplied to the pressure piston (the brake operating power) is smaller than the set load of the return spring of the master cylinder, the fluid pressure is not generated in the pressure chamber. Therefore, when the value between these values is determined to the first predetermined amount of the operation, it can detect the booster function failure surely.

(7) A brake device as in any one of clauses (1)–(6), wherein the fluid pressure source device includes the master cylinder which generates the fluid pressure corresponding to the input power, and the failure detector includes a bottoming detector which detects a bottoming condition in the master cylinder.

For example, it can detect the type of the failure based on both the detected result of whether the bottoming condition is detected or not, and both the amount of the brake operation and the pressure of the fluid pressure source. Even if both the amount of the brake operation and the pressure of the fluid pressure source are the same, it can distinguish the different failures based on whether the bottoming condition is detected or not.

The bottoming condition is the condition in which, if the master cylinder has one pressure piston, the pressure piston is contacted to the stopper disposed in the master cylinder itself (it can be replaced to the bottom of the master cylinder itself). If the master cylinder has two pressure pistons, the bottoming condition is the condition in which: ① the pressure piston in front of the two pressure pistons is contacted to the stopper of the master cylinder 14 (it may be located at the bottom part of the master cylinder as well), ② the rear pressure piston is contacted to the front pressure piston, or ③ both the condition ① and the condition ② occurs (the front pressure piston is contacted to the master cylinder etc. and the rear pressure piston is contacted to the front piston).

The bottoming condition can be detected based on at least either of the changing condition of the amount of the brake operation or the changing condition of the pressure of the fluid pressure source devices; some embodiments are explained in the following clauses (8) through (16).

The bottoming detector can detect the condition in which the pressure piston is contacted to the master cylinder itself (either of the above mentioned conditions), or the contacting situation.

(8) A brake device as in clause (7), wherein the brake operating amount detector includes an operation power detector which detects the power supplied to the brake operating member, and the bottoming detector detects the bottoming condition based on whether an increasing gradient of the operation power detected by the brake operating amount detector is larger than the predetermined gradient or not.

In the bottoming condition, the reaction power supplied to the pressure piston is increased with an increase of the brake operation power. Since the pressure of the master cylinder is decreased rapidly, it is common that the driver increases the brake operation power rapidly. Therefore, when the bottoming condition occurs, the increasing gradient of the brake operation power becomes large, and it can detect the bottoming condition based on this fact. It can detect the bottoming condition based on the changing condition of the increasing gradient of the brake operation power. If the bottoming condition occurs, the increasing gradient is increased rapidly, and it can detect the bottoming condition based on this fact (for example, if the increasing gradient is larger than the predetermined ratio or if the increasing ratio of the increasing gradient is larger than the predetermined ratio and so on).

(9) A brake device as in clause (7) or (8), wherein the fluid source pressure detector includes a master cylinder pressure detector which detects the pressure of the pressure chamber of the master cylinder or the connected portion of the master cylinder, and the bottoming detector detects the bottoming condition based on whether the decreasing gradient of the master pressure detected by the master cylinder pressure detector is larger than the predetermined gradient or not during the brake operation.

When the bottoming condition occurs, the fluid pressure of the master cylinder is decreased rapidly. Therefore, it can detect the bottoming condition based on the decreasing gradient of the fluid pressure of the master cylinder. Like the former clause, it can detect the bottoming condition based on the changing condition of the decreasing gradient of the fluid pressure of the master cylinder.

(10) A brake device as in any one of clauses (7)–(9), wherein the brake operating amount detector includes a stroke detector which detects the operating stroke of the brake operating member, and the bottoming detector detects the bottoming condition based on whether the increasing gradient of the stroke detected by the stroke detector is smaller than the predetermined gradient.

In the bottoming condition, the increasing gradient of the operating stroke becomes very small. Therefore, it can detect the bottoming condition based on the increasing gradient of the operating stroke. It can detect the bottoming condition based on the changing condition of the increasing gradient of the operating stroke.

In the bottoming condition, in the case of above mentioned ③, i.e., ① the front pressure piston is contacted to the master cylinder 14 itself; and ② the rear pressure piston is contacted to the front pressure piston, the increasing gradient of the stroke becomes 0, and the stroke is kept at the constant value, but in the case of ① the front pressure piston is contacted to the master cylinder 14 itself or ② the rear pressure piston is contacted to the front pressure piston, the increasing gradient does not become 0. But in this case, the increasing gradient becomes very small.

(11) A brake device as in clause (10), wherein the bottoming detector detects the bottoming condition based on the detected stroke at the time when the stroke detected by the stroke detector is larger than the predetermined stroke.

If the operating stroke of the brake operating member is kept almost a constant stroke, the changing gradient of the detected stroke becomes very small even if the bottoming condition does not occur. But in this case, the detected stroke is not a large value. Therefore, it can detect the bottoming condition accurately.

(12) A brake device as in any one of clauses (7)–(11), wherein the fluid pressure source device includes ① a master cylinder which generates the fluid pressure corresponding to the input power, ② (a) a first chamber which is connected to the intake air side of the combustion chamber of the engine, (b) a second chamber which is changed from the sealing condition which is sealed from the atmosphere to the connecting condition which is connected to the atmosphere, a booster which increases the operating power supplied to the brake operating member and outputs to the master cylinder based on the pressure difference between the first chamber and the second chamber, the fluid source pressure detector includes a booster pressure detector which detects the pressure of the first chamber of the booster, and the bottoming detector detects the bottoming condition based on whether the booster pressure detected by the booster pressure detector is changed to a condition in which the booster pressure is approached to the vacuum pressure or not.

The pressure of the first chamber (the vacuum chamber) is approached to the pressure of the atmosphere as the operating stroke increases, but when the stroke is not increased because of the bottoming condition, the pressure is not approached to the pressure of the atmosphere. In this situation, the pressure is approached to the vacuum pressure if the engine is in the normal condition. The pressure of the first chamber is changed from the tendency of approaching to the atmosphere to the tendency of approaching to the vacuum. On the other hand, as described above, the stroke is increased slightly even if the bottoming condition occurs. In this case, the pressure is not always approached to the vacuum at once in the bottoming condition. The tendency of approaching to the atmosphere of the pressure of the first chamber is decreased or the pressure is kept at the constant value, in either case, it is changed to the condition of approaching to the vacuum.

(13) A brake device as in clause (12), wherein the bottoming detector detects the bottoming condition based on the detected booster pressure when the brake operation detected by the brake operating amount detector is increasing situation.

If the operating power supplied to the brake operating member is decreased by the driver or the operating power is kept at a constant value when the bottoming condition does not occur, the booster pressure is changed to the condition of approaching to the vacuum. On the other hand, the booster pressure is not approached to the vacuum pressure when the brake operating power is increasing. It can detect the bottoming condition accurately based on this fact.

(14) A brake device as in any one of clauses (7)–(13), wherein the bottoming detector detects the bottoming condition if two of the four conditions, ① the changing condition of the brake operating power, ② the changing condition of the pressure of the master cylinder, ③ the changing of the operating stroke, ④ the changing condition of the pressure of the booster, are satisfied.

It can detect the bottoming condition based on whether one condition is satisfied of ① though ④, but it can also detect the bottoming condition based on whether two conditions are satisfied of ① though ④. In this case, the accuracy of the detection of the bottoming condition is improved.

(15) A brake device as in any one of clauses (7)–(14), wherein the fluid source pressure detector includes a master cylinder pressure detector which detects the pressure of the master cylinder or the connected portion of the master cylinder, the failure detector detects a small amount of fluid leakage failure based on whether the master pressure detected by the master cylinder pressure detector at the time when the brake operation detected by the brake operating amount detector is the first predetermined operation is larger than the first predetermined pressure, and the decreasing gradient of the master pressure detected by the master cylinder pressure detector is larger than the predetermined gradient, and the brake fluid control device includes a leakage amount control device which increases the supplying amount of the fluid to the brake, if the failure detector detects the small amount of fluid leakage failure, from the supplying amount of the fluid when the large amount of fluid leakage failure is detected.

The case in which the master pressure at the time when the brake operation is the first predetermined operation is larger than the first predetermined pressure is either the small amount fluid leak failure or the normal condition of the brake device. In the large fluid leakage case, since the fluid pressure of the master cylinder is very small before the detection of the bottoming condition, the decreasing gradient of the fluid pressure of the master cylinder does not always become large. Therefore, the master pressure of the first predetermined operation is larger than the first predetermined pressure, and if the decreasing gradient when the bottoming condition is detected is large, it can detect the small amount fluid leakage failure.

If the small amount fluid leakage failure is detected, the supplying amount of fluid is increased from the large amount fluid leakage failure case, because if the supplying amount of fluid is increased in the large amount fluid leakage case, it is not desirable to increase the fluid leakage. On the other hand, if the supplying amount of fluid is increased in the small amount fluid leakage case, it can reduce the delay of the increasing the brake fluid pressure.

(16) A brake device as in any one of clauses (7)–(15), wherein the failure detector includes a bottoming failure detector which distinguishes the bottoming failure which is the failure of the bottoming condition in the master cylinder from other failures.

In this brake device described in this clause, the bottoming failure which occurs because of the bottoming condition is distinguished from the booster function failure and so on. The bottoming failure is detected based on at least one of the brake operation detected by the brake operating amount detector and the pressure of the fluid source detected by the fluid source pressure detector.

(17) A brake device comprising a fluid pressure source device having a master cylinder which generates a fluid pressure corresponding to an operating power supplied to the brake operating member, and a brake that is operated by the fluid pressure generated by the fluid pressure source device, and comprising:

a bottoming detector which detects a bottoming condition in the master cylinder based on at least one condition of the changing condition of the operating amount of the brake operating member and the changing condition of the pressure of the fluid pressure source device, a failure detector which detects different types of failures based on whether the bottoming condition is detected or not, and a brake fluid control device which controls the brake fluid pressure in different ways based on the type of the failure detected by the failure detector.

For example, if the bottoming condition is detected, it can detect the fluid leakage because the bottoming condition is caused by the fluid leakage. When the bottoming condition is detected, the fluid leakage has not always occurred.

(18) A brake device as in any one of clauses (1)–(17), wherein the fluid pressure source device includes a master cylinder which generates the fluid pressure corresponding to the input power, a booster which increases the operation power of the brake operation member and outputs to the master cylinder, the brake operating amount detector includes an operating power detector which detects the operating power supplied to the brake operating member, the fluid source pressure detector includes a master cylinder pressure detector which detects the pressure of the master cylinder or the connected portion of the master cylinder, and the failure detector includes a booster failure detector which detects the booster failure in the brake operation from the other failures based on whether either of ③ the increasing gradient of the operating power detected by the operating power detector is larger than the predetermined gradient, or ④ the decreasing gradient of the pressure detected by the fluid source detector is larger than the predetermined gradient is satisfied and when the master pressure detected by the master cylinder pressure detector is larger than the predetermined pressure.

If the booster failure occurs during the brake operation, the brake operating power increases, and the quasi-bottoming condition which is similar to the bottoming condition in which the master fluid pressure is decreased rapidly occurs. But in the booster failure, the fluid pressure of the master cylinder does not become smaller than the predetermined pressure after the bottoming condition. Therefore, even if the quasi-bottoming condition is detected, it can distinguish the booster failure from the fluid leakage failure based on the fluid pressure of the master cylinder after that time.

In other words, the brake device described in this clause can detect the actual bottoming condition and the quasi-bottoming condition. The technical feature described in this clause is applicable independently from the features of clauses (1) through (16). For example, it may not be the failure detector which detects the type of the failure.

(19) A brake device as in any one of clauses (1)–(18), wherein the fluid pressure source device is a master cylinder which has two pressure chambers and generates the fluid pressure corresponding to the input power, and includes a front side brake connected to either of the two pressure chambers and a rear side brake connected to the other pressure chamber, and the fluid source pressure detector includes a front wheel side pressure detector which detects the fluid pressure of the pressure chamber which is connected to the front wheel side brake or the portion connected to the pressure chamber of the master cylinder.

Since it is common that the larger brake power can be obtained in the front wheel side, the detection of the failure in the front wheel side is more important than the rear wheel side. The technical feature described in this clause is applicable independently from the features of clauses (1) through (17).

(20) A brake device as in clause (19), wherein the master cylinder includes the two pressure chambers which are set in series with each other.

In the brake device described in this clause, the master cylinder is a tandem type.

(21) A brake device as in any one of clauses (2)–(20), wherein the brake fluid control device includes a failure type related fluid control device which controls the fluid pressure source device based on the type of the failure detected by the failure detector.

The brake fluid pressure is controlled by controlling of the fluid pressure source device. Therefore, if it controls the fluid pressure source device based on the type of the failure, it can control the brake fluid pressure based on that. For example, if the fluid pressure source device includes the above mentioned compressing device, the control condition of the supplying energy to the compressing device is changed based on the type of the failure, and the supplying current to the fluid control valve is changed based on the type of the failure.

(22) A brake device as in clause (21), wherein the brake fluid control device includes a normal condition fluid control device which controls the fluid pressure source device so as to make the brake fluid pressure approach to the target fluid pressure which is determined based on the operating condition of the brake operating member, and the failure type related fluid control device includes a failure type related target pressure determination device which determines the target fluid pressure based on the type of the failure.

If the target fluid pressure in the case in which the brake fluid pressure is controlled so that the requested brake power by the driver is determined based on, for example, the operating condition of the brake operating member is determined based on the type of the failure, the decline of the brake power caused by the failure can be reduced. For example, the value of the gain to the brake operating condition is changed, or the amount of the compensation of the target pressure is changed.

The target pressure in the failure condition is not always determined so that the current pressure is approached to the brake condition in the normal condition, it can be determined to be a smaller fluid pressure than the brake fluid pressure in the normal condition. Therefore it can inform the driver of the occurrence of the failure surely.

(23) A brake device as in any one of clauses (19)–(22), wherein the brake fluid control device controls so that if the failure is detected in the front wheel side brake system, the brake fluid pressure in the rear wheel side brake system is increased.

When the front wheel side brake system is in the failure condition, if the brake fluid pressure of the rear wheel side brake system is increased, the decline of the brake power caused by the failure can be reduced. It is desirable to make the brake fluid pressure of the rear wheel side be the maximum value.

(24) A brake device as in any one of clauses (2)–(23), wherein the fluid pressure source device includes a master cylinder which has a pressure chamber that generates the fluid pressure corresponding to the input power, a first compressing device which compresses the operated fluid of the pressure chamber of the master cylinder and supplies to the brake, a second compressing device which compresses the operated fluid stored in the atmospheric condition in a reservoir tank which is larger than the pressure chamber of the master cylinder, and the brake fluid control device includes a brake condition selection device which selects either of a first condition in which the brake is compressed by the first compressing device, or a second condition in which the brake is compressed by the second compressing device based on the type of the failure.

In the second condition, the supplying fluid to the brake becomes larger than the first condition. Therefore, if the small amount fluid leakage condition is detected, it is desirable to select the second condition.

(25) A brake device as in clause (24), wherein the brake condition selection device selects the first condition if at least the booster failure or the large amount fluid leakage failure is detected by the failure detector, and selects the second condition if the small amount fluid leakage failure is detected.

(26) A brake device having a fluid pressure source device comprising a master cylinder which generates a fluid pressure corresponding to an operating power of a brake operating member, the brake device actuated by the fluid pressure generated by the fluid pressure source, and comprising:

a bottoming detector which detects a bottoming condition in the master cylinder based on either of at least a changing condition of the operation of the brake operating member or a changing condition of the pressure of the fluid pressure source device.

What is claimed is:

1. A brake device having a fluid pressure source which generates a fluid pressure based on an operation of a brake operating member, the brake device comprising:

a brake operating amount detector which detects an operating amount of the brake operating member, a fluid source pressure detector which detects the pressure generated in the fluid pressure source, and a failure detector which detects and distinguishes between different types of failures of the brake device based on the pressure detected by the fluid source pressure detector and the operating amount detected by the brake operating amount detector, wherein the failure detector detects and distinguishes the types of the failures between: (i) a case in which the pressure detected by the fluid source pressure detector at a time when the detected operating amount is a first predetermined amount of operation is smaller than a first predetermined pressure, the first predetermined amount of operation is smaller than a second predetermined amount of operation and the first predetermined pressure is larger than a second predetermined pressure, (ii) a case in which the pressure detected by the fluid source pressure detector at the time when the detected operating amount is the first predetermined amount of operation is larger than the first predetermined pressure, and (iii) a case in which the pressure detected by the fluid source pressure detector at a time when the operating amount detected by the brake operating amount detector is the second predetermined amount of operation is larger than the second predetermined pressure.

2. The brake device as in claim 1, wherein the fluid pressure source includes a master cylinder which generates the fluid pressure corresponding to an input power, and a booster which increases an operation power of the brake operating member and outputs an increased operation power to the master cylinder, the fluid source pressure detector includes a master cylinder pressure detector which detects the pressure of the master cylinder or a connected portion of the master cylinder, and the failure detector detects a failure of the booster in the case that the pressure of the master cylinder at the time when the operating amount of the brake operation detected by the operating amount detector is the second predetermined amount of operation is larger than the second predetermined pressure, and detects the failure of fluid leakage of the brake device in a case that the pressure of the master cylinder at the time when the amount of the brake operation is the second predetermined amount of operation is smaller than the second predetermined pressure.

3. The brake device as in claim 2, wherein the failure detector includes a bottoming detector which detects a bottoming condition in the master cylinder.

4. The brake device as in claim 3, wherein the brake operating amount detector includes an operation power detector which detects power supplied to the brake operating member, and the bottoming detector detects the bottoming condition based on whether an increasing gradient of the operation power detected by the brake operating amount detector is larger than a predetermined gradient or not.

5. The brake device as in claim 4, further comprising a brake fluid control device which controls a brake fluid pressure in different ways based on the type of the failure detected by the failure detector, wherein the fluid source pressure detector includes a master cylinder pressure detector which detects a master pressure of the master cylinder pressure detector or a connected portion of the master cylinder pressure detector, the failure detector detects a small amount fluid leakage failure in the case that the pressure detected by the master cylinder pressure detector at the time when the brake operation detected by the brake operating amount detector is the first predetermined operation is larger than the first predetermined pressure, and a decreasing gradient of the master pressure detected by the master cylinder pressure detector is larger than a predetermined gradient, and the brake fluid control device includes a leakage amount control device which increases a supplying amount of a brake fluid to a brake, if the failure detector detects the small amount fluid leakage failure, compared to the supplying amount of the brake fluid when a large amount fluid leakage failure is detected.

6. The brake device as in claim 4, wherein:

the master cylinder has two pressure chambers and generates the fluid pressure corresponding to the input power, the brake device includes a front side brake connected to one of the two pressure chambers and a rear side brake connected to the other of the two pressure chambers, and the fluid source pressure detector includes a front wheel side pressure detector which detects the fluid pressure of the pressure chamber which is connected to the front side brake or a portion connected to a corresponding pressure chamber of the master cylinder.

7. The brake device as in claim 1, further comprising a brake fluid control device which controls a brake fluid pressure in different ways based on the type of the failure detected by the failure detector, wherein the fluid pressure source includes a master cylinder which has a pressure chamber and generates the fluid pressure corresponding to an input power, a first compressing device which compresses an operating fluid of the pressure chamber of the master cylinder and supplies a compressed operating fluid to a brake, a second compressing device which compresses the operating fluid stored in an atmospheric condition in a reservoir chamber, the reservoir chamber is larger than the pressure chamber of the master cylinder, and the brake fluid control device includes a brake condition selection device which selects either of a first condition in which the brake is compressed by the first compressing device, or a second condition in which the brake is compressed by the second compressing device based on the type of the failure detected by the failure detector.

8. A brake device having a fluid pressure source which generates a fluid pressure based on an operation of a brake operating member, the brake device comprising:

a brake operating amount detector which detects an operating amount of the brake operating member, a fluid source pressure detector which detects the fluid pressure generated in the fluid pressure source, a failure detector which detects and distinguishes between different types of abnormal failures of the brake device based on the pressure detected by the fluid source pressure detector and the operating amount detected by the brake operating amount detector, and a brake fluid control device which controls the brake fluid pressure in different ways based on the type of the failure detected by the failure detector, wherein the fluid pressure source includes a master cylinder which has a pressure chamber and generates the fluid pressure corresponding to an input power, a first compressing device which compresses an operating fluid of the pressure chamber of the master cylinder and supplies a compressed operating fluid to a brake, a second compressing device which compresses the operating fluid stored in an atmospheric condition in a reservoir chamber, the reservoir chamber is larger than the pressure chamber of the master cylinder, and the brake fluid control device includes a brake condition selection device which selects either of a first condition in which the brake is compressed by the first compressing device, or a second condition in which the brake is compressed by the second compressing device based on the type of the failure detected by the failure detector.

9. The brake device as in claim 8, wherein the failure detector includes a bottoming detector which detects a bottoming condition in the master cylinder.

10. The brake device as in claim 9, wherein the brake operating amount detector includes an operation power detector which detects a power supplied to the brake operating member, and the bottoming detector detects the bottoming condition based on whether an increasing gradient of the operation power detected by the brake operating amount detector is larger than a predetermined gradient or not.

11. The brake device as in claim 9, wherein the fluid source pressure detector includes a master cylinder pressure detector which detects the pressure in the pressure chamber of the master cylinder or a connected portion of the master cylinder, the failure detector detects a small amount fluid leakage failure if the master pressure detected by the master cylinder pressure detector at the time when the brake operation detected by the brake operating amount detector is a first predetermined operation is larger than a first predetermined pressure, and a decreasing gradient of the master pressure detected by the master cylinder pressure detector is larger than a predetermined gradient, and the brake fluid control device includes a leakage amount control device which increases a supplying amount of a brake fluid to a brake if the failure detector detects a small amount fluid leakage failure, compared to the supplying amount of the brake fluid when a large amount fluid leakage failure is detected.

12. The brake device as in claim 8, wherein:

the master cylinder has at least one pressure chamber and generates the fluid pressure corresponding to the input power, the brake device includes a front side brake connected to a one of the at least one pressure chamber and a rear side brake connected to a second pressure chamber of the at least one pressure chamber, and the fluid source pressure detector includes a front wheel side pressure detector which detects the fluid pressure of the at least one pressure chamber which is connected to the front side brake or a portion connected to the at least one pressure chamber of the master cylinder.

13. A brake device having a fluid pressure source which generates a fluid pressure based on an operation of a brake operating member, the brake device comprising:

a brake operating amount detector which detects an operating amount of the brake operating member, a fluid source pressure detector which detects the pressure generated in the fluid pressure source, and a failure detector which detects and distinguishes between different types of abnormal failures of the brake device based on the pressure detected by the fluid source pressure detector and the operating amount detected by the brake operating amount detector, wherein the fluid pressure source device includes a master cylinder which generates the fluid pressure corresponding to an input power, and the failure detector includes a bottoming detector which detects a bottoming condition in the master cylinder based on whether an increasing gradient of the brake operating amount detected by the brake operating amount detector is larger than a predetermined gradient.

14. The brake device as in claim 13, wherein the brake operating amount detector includes an operation power detector which detects an operation power supplied to the brake operating member, and the bottoming detector detects the bottoming condition based on whether an increasing gradient of the operation power detected by the brake operating amount detector is larger than a predetermined gradient or not.

15. The brake device as in claim 13, wherein the master cylinder has two pressure chambers and generates the fluid pressure corresponding to the input power, and the brake device includes a front side brake connected to one of the two pressure chambers and a rear side brake connected to the other of the two pressure chambers, and the fluid source pressure detector includes a front wheel side pressure detector which detects the fluid pressure of the pressure chamber which is connected to the front wheel side brake or a portion connected to a corresponding pressure chamber of the master cylinder.

16. The brake device as in claim 13, wherein the fluid source pressure detector includes a master cylinder pressure detector which detects a master pressure of a pressure chamber of the master cylinder or of a portion connected to the master cylinder, and the bottoming detector detects the bottoming condition based on whether a decreasing gradient of the master pressure detected by the master cylinder pressure detector is larger than a predetermined gradient.

17. The brake device as in claim 13, wherein the brake operating amount detector includes a stroke detector which detects an operating stroke of the brake operating member, and the bottoming detector detects the bottoming condition based on whether an increasing gradient of the stroke detected by the stroke detector is smaller than a predetermined gradient.

18. The brake device as in claim 13, further comprising a brake fluid control device which controls the brake fluid pressure in different ways based on the type of the failure detected by the failure detector.

19. A brake device having a fluid pressure source which generates a fluid pressure based on an operation state of a brake operating member, the brake device comprising:

a fluid source pressure detector which detects the pressure generated in the fluid pressure source; and a failure determining device which determines that there is a first abnormal failure when a combination of the operation state of the brake operating member and the fluid pressure is in a first combination state, and determines that there is a second abnormal failure being different from the first abnormal failure if the combination of the operation of the brake operating member and the fluid pressure is in a second combination state, which is different from the first combination state, wherein the fluid pressure source includes a master cylinder which generates the fluid pressure corresponding to an input power, and the failure determining device has a bottom detector which detects a bottoming condition in the master cylinder based on whether an increasing gradient of a brake operating amount detected by a brake operating amount detector is larger than a predetermined gradient.

20. A brake device as in claim 19, wherein the failure determining device detects and distinguishes the types of the failures between a case in which the pressure detected by the fluid source pressure detector at the time when the detected amount of the brake operation is a first predetermined amount of operation which is smaller than a first predetermined pressure, the first predetermined amount of operation is larger than a second predetermined amount of operation, which the first predetermined pressure is smaller than a second predetermined pressure, and a case in which the fluid pressure is larger than the second predetermined pressure, and if the fluid pressure detected by the fluid source pressure detector at a time when the amount of the brake operation detected by the brake operation amount detector is the first predetermined amount of operation is smaller than the first predetermined pressure.

21. The brake device as in claim 20, further comprising:

a booster which increases an operation power of the brake operating member and outputs an increased operation power to the master cylinder, wherein the fluid source pressure detector includes a master cylinder pressure detector which detects the pressure of the master cylinder or a connected portion of the master cylinder, and the failure determining device detects a failure of the booster in the case that the pressure of the master cylinder at the time when the operating amount of the brake operation detected by the operating amount detector is the second predetermined amount of operation is larger than the second predetermined pressure, and detects the failure of fluid leakage of the brake device in a case that the pressure of the master cylinder at the time when the amount of the brake operation is the second predetermined amount of operation is smaller than the second predetermined pressure.

22. The brake device as in claim 21, wherein the brake operating amount detector includes an operation power detector which detects power supplied to the brake operating member, and the bottoming detector detects the bottoming condition based on whether an increasing gradient of the operation power detected by the brake operating amount detector is larger than a predetermined gradient or not.

23. The brake device as in claim 22, further comprising a brake fluid control device which controls a brake fluid pressure in different ways based on the type of the failure detected by the failure determining device, wherein the failure determining device detects a small amount fluid leakage failure in the case that the pressure detected by the master cylinder pressure detector at the time when the brake operation detected by the brake operating amount detector is the first predetermined operation is larger than the first predetermined pressure, and a decreasing gradient of the master pressure detected by the master cylinder pressure detector is larger than a predetermined gradient, and the brake fluid control device includes a leak amount control device which increases a supplying amount of a brake fluid to a brake, if the failure determining device detects the small amount fluid leakage failure, compared to the supplying amount of the brake fluid when a large amount fluid leakage failure is detected.

24. The brake device as in claim 22, wherein:

the master cylinder has two pressure chambers and generates the fluid pressure corresponding to the input power, the brake device includes a front side brake connected to one of the two pressure chambers and a rear side brake connected to the other of the two pressure chambers, and the fluid source pressure detector includes a front wheel side pressure detector which detects the fluid pressure of the pressure chamber which is connected to the front side brake or a portion connected to a corresponding pressure chamber of the master cylinder.

25. The brake device as in claim 19, further comprising a brake fluid control device which controls a brake fluid pressure in different ways based on the type of the failure detected by the failure determining device, wherein the fluid pressure source includes a master cylinder which has a pressure chamber and generates the fluid pressure corresponding to an input power, a first compressing device which compresses an operating fluid of the pressure chamber of the master cylinder and supplies a compressed operating fluid to a brake, a second compressing device which compresses the operating fluid stored in an atmospheric condition in a reservoir chamber, the reservoir chamber is larger than the pressure chamber of the master cylinder, and the brake fluid control device includes a brake condition selection device which selects either of a first condition in which the brake is compressed by the first compressing device, or a second condition in which the brake is compressed by the second compressing device based on the type of the failure detected by the failure detector.

26. A brake device having a fluid pressure source device which generates a fluid pressure based on an operation state of a brake operating member, the brake device comprising:

a fluid source pressure detector which detects the pressure generated in the fluid pressure source device;

a failure determining device which determines that there is a first abnormal failure when a combination of an operation of the brake operating member and the fluid pressure is in a first combination state, and determines that there is a second abnormal failure being different from the first abnormal failure if the combination of the operation of the brake operating member and the fluid pressure is in a second combination, which is different from the first combination state; and a brake fluid control device which controls the brake fluid pressure in a first way when the failure determining device determines that there is the first abnormal failure, and controls the brake fluid in a second way, which is different from the first way, when the failure determining device determines that there is the second abnormal failure, wherein the fluid pressure source includes a master cylinder which generates the fluid pressure corresponding to an input power, and the failure determining device has a bottom detector which detects a bottoming condition in the master cylinder based on whether an increasing gradient of the brake operating amount detected by a brake operating amount detector is larger than a predetermined gradient.

* * * * *